US012647254B2

(12) United States Patent
Naito et al.

(10) Patent No.: US 12,647,254 B2
(45) Date of Patent: Jun. 2, 2026

(54) DATA FILE ENCRYPTION AND TRANSMISSION/RECEPTION SYSTEM AND DATA FILE ENCRYPTION AND TRANSMISSION/RECEPTION METHOD

(71) Applicant: Hitachi, Ltd., Tokyo (JP)

(72) Inventors: Narumi Naito, Tokyo (JP); Masaki Kubota, Tokyo (JP); Shinji Murase, Tokyo (JP); Keiichi Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 332 days.

(21) Appl. No.: 18/036,023

(22) PCT Filed: Sep. 13, 2021

(86) PCT No.: PCT/JP2021/033576
§ 371 (c)(1),
(2) Date: May 9, 2023

(87) PCT Pub. No.: WO2022/137668
PCT Pub. Date: Jun. 30, 2022

(65) Prior Publication Data
US 2024/0022397 A1     Jan. 18, 2024

(30) Foreign Application Priority Data
Dec. 25, 2020     (JP) ................................. 2020-216616

(51) Int. Cl.
*H04L 9/08* (2006.01)
*G06F 21/62* (2013.01)
(52) U.S. Cl.
CPC ........ *H04L 9/0825* (2013.01); *G06F 21/6209* (2013.01); *H04L 9/0861* (2013.01)

(58) Field of Classification Search
CPC ..... H04L 9/0825; H04L 9/0861; H04L 9/008; H04L 9/0822; H04L 9/088; H04L 9/0894; G06F 21/6209; G06F 16/31
See application file for complete search history.

(56) References Cited

U.S. PATENT DOCUMENTS 5,504,891 A     4/1996  Motoyama et al.
5,870,473 A     2/1999  Boesch et al.
(Continued)

FOREIGN PATENT DOCUMENTS

JP          07-334496 A       12/1995
JP          2005-011373 A      1/2005
(Continued)

OTHER PUBLICATIONS

International Search Report of PCT/JP2021/033576 dated Nov. 30, 2021.

*Primary Examiner* — Meng Li
*Assistant Examiner* — Lydia L Noel
(74) *Attorney, Agent, or Firm* — MATTINGLY & MALUR, PC

(57)          ABSTRACT
A data file encryption transmission/reception system includes a computer with a registration module that encrypts input data files. The registration module includes a string conversion module that configured to convert the data file to be encrypted to string data, a key generation module that configured to generate a common key, and to divide the common key and the string data into first input information and second input information, a common key encryption module is configured to encrypt the first input information with the common key, to thereby generate common key encrypted data, a searchable encryption module that configured to encrypt the second input information in accordance with searchable encryption with a user secret key set in advance, to thereby generate searchable encrypted data and (Continued)

a communication module is configured to register a set of the common key encrypted data and the searchable encrypted data in the data management server.

13 Claims, 14 Drawing Sheets

(56)                References Cited

U.S. PATENT DOCUMENTS

| | | | |
|---|---|---|---|
| 10,140,370 B1 * | 11/2018 | Zhang | ................. G06F 21/6218 |
| 2009/0300351 A1 | 12/2009 | Lei et al. | |
| 2011/0145580 A1 | 6/2011 | Auradkar et al. | |
| 2011/0302166 A1 | 12/2011 | Moriya et al. | |
| 2013/0262863 A1 | 10/2013 | Yoshino et al. | |
| 2016/0366113 A1 * | 12/2016 | Dawoud | ................. G06F 16/14 |
| 2019/0036679 A1 * | 1/2019 | Hirano | ..................... G09C 1/00 |
| 2021/0234684 A1 | 7/2021 | Maruyama et al. | |

FOREIGN PATENT DOCUMENTS

| | | | |
|---|---|---|---|
| JP | 2006-067412 A | 3/2006 |
| JP | 2010-061103 A | 3/2010 |
| JP | 2012-123614 A | 6/2012 |
| JP | 2013-513834 A | 4/2013 |
| WO | 2010/047286 A1 | 4/2010 |
| WO | 2012/077541 A1 | 6/2012 |
| WO | 2020/003821 A1 | 1/2020 |

* cited by examiner

4  NETWORK

1  DATA MANAGEMENT SERVER

2
REGISTRATION
CLIENT TERMINAL

2
REGISTRATION
CLIENT TERMINAL

3
SEARCH
CLIENT TERMINAL

3
SEARCH
CLIENT TERMINAL

200
SEARCHABLE
ENCRYPTED DATA

COMMON KEY
ENCRYPTED DATA

100

3 SEARCH CLIENT TERMINAL

31 PROCESSOR

33 STORAGE DEVICE

34 NETWORK I/F

35 INPUT/OUTPUT DEVICE

32 MEMORY

SEARCHABLE CRYPTOGRAPH DECRYPTION MODULE — 310

COMMON KEY CRYPTOGRAPH DECRYPTION MODULE — 320

STRING CONVERSION MODULE — 330

USER SECRET KEY — 460

DATA FILE ENCRYPTION AND TRANSMISSION/RECEPTION SYSTEM AND DATA FILE ENCRYPTION AND TRANSMISSION/RECEPTION METHOD

CLAIM OF PRIORITY

The present application claims priority from Japanese patent application JP 2020-216616 filed on Dec. 25, 2020, the content of which is hereby incorporated by reference into this application.

BACKGROUND

This invention relates to a data file encryption and transmission/reception system which achieves search by a file name and high-speed transmission and reception of a file while maintaining high security through application of a searchable cryptograph technology.

An operation and management form called "cloud," which uses an information system provided by another organization, has been attracting attention for the purpose of efficient development, operation, and management of an information system. As prevention measures against unauthorized leakage in the cloud, when electronic data is searched for, a search result can be acquired and decrypted without necessity of release of a mask by a DB server through use of, for example, a searchable cryptograph technology as described in JP 2012-123614 A.

However, confidential information is included in not only the electronic data but a file which is binary data, and hence it is required to take prevention measures against the unauthorized leakage.

There have been proposed various encryption technologies in order to prevent leakage and eavesdropping on a communication path when the data is to be stored in the cloud. In the hybrid cryptography used in the SSL/TLS as a current standard technology, a transmitter side encrypts a plaintext with a common key generated through a predetermined method, encrypts the common key with a public key received in advance from a receiver, and transmits the encrypted plaintext and common key to the receiver. The receiver side decrypts the transmitted common key with a secret key, and decrypts the plaintext encrypted with the common key, to thereby achieve safe and high-speed transmission.

As an example of a general method of the technology for the data file encryption system, there is a method in which a data file is encrypted in accordance with the common key method through use of temporary key information extracted from a master random number randomly generated at a transmission destination, a master random number control value and a random number are encrypted in accordance with the public key method with a public key shared with a transmission source in advance, and the encrypted data file and the encrypted master random number control value and random number are then transmitted to the transmission source.

The transmission source decrypts the master random number control value and the random number with a secret key, and decrypts the encrypted data file in accordance with the common key method through use of the temporary key information extracted from the master random number generated by using the master random number control value or the decrypted random number, to thereby implement the method (for example, JP 2009-177304 A and JP 2006-067412 A).

SUMMARY

In JP 2009-177304 A, in order to use a password which changes every time and is used only once, namely, a so-called onetime password, for the encryption of the data file, a part of the master random number generated randomly is used. In order to encrypt and decrypt the data file, it is required for the transmission side and the reception side to share the same random number. In JP 2009-177304 A, the random number is not directly transmitted, but the master random number control value for processing the master random number is encrypted, and is then transmitted.

In JP 2006-067412 A, the random number is generated based on, for example, a hash value of data representing a current time or information to be transmitted, to thereby generate a onetime password ("session key" in JP 2006-067412 A). This random number is encrypted in accordance with the public key cryptography, and is then transmitted.

As described above, even when the random number or the value for generating the random number used to increase the security is encrypted, it is a problem that the random number or the value for generating the random number is transmitted via a communication network such as the Internet.

A hash function used in JP 2006-067412 A has such a nature that the same original data is converted to the same value (hash value) having a fixed length. In particular, it is required for a cryptographic hash function to have such a feature that it is practically impossible (pre-image resistance and weak collision resistance) to obtain, from a given hash value, an input value of the hash function which outputs this hash value.

Because of this feature, the hash value is considered as being in an irreversible encrypted state, and hence it is insisted that leakage of a hashed ID or password not cause a problem. However, there actually exist a large number of cases in which even a hashed ID or password is analyzed, and is then illegally used.

For example, it was reported in May 2016 that the number of persons whose passwords have leaked from US LinkedIn being business social media in 2012 may be more than 117 million. Those passwords were hashed, but account information including electronic mails and passwords were sold in black market, and 200 thousand or more cases of illegal use have been reported.

As described above, it cannot be considered that the hash method which is the standard security method actually has high security. As a representative attack method against the hash value, "rainbow table" is known. This attack method is a method involving generating a correspondence table between plaintexts and hash values, and searching the hash values to find a corresponding plaintext, to thereby illegally obtain information concealed through the hashing.

As countermeasures against this attack, there are methods called "salt" which adds a string to data to be hashed and "stretching" which repeatedly applies the hashing. However, those methods only increase a time required to analyze the hash value, and does not essentially prevent the analysis of the hash value.

As described above, the problem is such a nature of determinativeness that a hash value generated when a certain value is input is always the same. It is thus desired to use encryption (probabilistic encryption method) not based on a constant law.

As the public key cryptographs used in JP 2009-177304 A and JP 2006-067412 A, the RSA cryptograph is generally often used. The RSA cryptograph has, as a basis of safety, the difficulty of the prime factorization of a composite number having a large number of digits. The standard RSA cryptograph has a vulnerability against the chosen-ciphertext attack which calculates a plaintext from a certain ciphertext, and hence it is considered that direct use of the RSA cryptography is inappropriate.

Thus, the RSA cryptograph is often implemented by generating and inserting, each time, a random number as padding. This is referred to as "RSA-optimal asymmetric encryption padding (OAEP) method," and is registered as a classification of technologies for confidentiality of the public key cryptography in "Cryptograph List to be Referred to for Procurement in Electronic Government (CRYPTREC cryptograph list)."

However, in the North American CMVP based on "Cryptographic Module Validation Program (CMVP)," which is a program for guaranteeing that approved security functions such as encryption functions, hash functions, signature functions, and the like described in the CRYPTREC cryptograph list are correctly implemented and executed in hardware, software, and the like, and hence important information is appropriately protected, problems were disclosed in almost a half of products in a cryptographic module test for the modules described in the CRYPTREC cryptograph list. As an investigation result obtained by a North American CMVP test organization, an average of approximately 57% of non-conformance cases were disclosed at the security levels of 1 and 2 during a period from the autumn of 2013 to the summer of 2014.

In other words, it is considered that the security can be ensured as long as the public key cryptography using the RSA-OAEP cryptography is correctly implemented, executed, and managed, but the actual implementation is difficult.

Moreover, the public key cryptography is a method of using a public key for the encryption, and using a secret key for the decryption. The keys are different from each other between the encryption and the decryption, and hence a person who encrypts a data file cannot execute the decryption by himself or herself.

Thus, there occurs no problem in a case in which the public key cryptography is applied to a system used for unidirectional transmission and reception such as a case in which the data file is attached to an electronic mail, and is then sent. However, there is a problem in that the public key cryptography cannot be applied to a system such as a file database in which a user registers an encrypted data file in a database, and this user again decrypts and acquires the data file registered by himself or herself.

Further, when the combination of the common key encryption method and the public key encryption method is used as described in JP 2009-177304 A and JP 2006-067412 A, the search cannot be carried out without the decryption, and hence the data is required to be decrypted for the search.

When a large number of encrypted data files are managed, it is desired that the search therefor be available. However, when the data files are decrypted each time the search is executed, a frequency at which the data files exist in plaintext in a datacenter increases, and hence a problem of security occurs.

In order to enable the search of the data files while the data files remain encrypted, there exists a system in which the file names are in plaintext, and the data files are encrypted. However, in this case, when eavesdropping occurs, the data file is easily inferred from the file name in plaintext. Thus, the problem in terms of security still remains.

This invention has been made in view of the above-mentioned problem, and has an object to achieve encryption and decryption, and transmission and reception of a data file while maintaining both of high speed and security performance of processing.

According to one aspect of the present invention, a data file encryption and transmission/reception system includes a computer with a registration module that encrypts input data files and register the encrypted data file in a data management server coupled via a network. The registration module includes a string conversion module, a key generation module, a common key encryption module, a searchable encryption module and a communication module. The string conversion module is configured to convert the data file to be encrypted to string data. The key generation module is configured to generate a common key, and to divide the common key and the string data into first input information and second input information. The common key encryption module is configured to encrypt the first input information with the common key, to thereby generate common key encrypted data. The searchable encryption module is configured to encrypt the second input information in accordance with searchable encryption with a user secret key set in advance, to thereby generate searchable encrypted data. The communication module is configured to register a set of the common key encrypted data and the searchable encrypted data in the data management server.

In the at least one embodiment of this invention, the information required to decrypt the data file is divided into the first input information and the second input information. The first input information is encrypted with the common key, and the second input information is encrypted through use of the searchable cryptograph. Thus, it is possible to achieve the encryption and decryption, and the transmission and reception of the data file while maintaining both of the high speed and the security performance of the processing.

DETAILED DESCRIPTION OF THE PREFERRED EMBODIMENTS

Details of at least one embodiment of a subject matter disclosed herein are set forth in the accompanying drawings and the following description. Other features, aspects, and effects of the disclosed subject matter become apparent from the following disclosure, drawings, and claims.

Now, embodiments of this invention are described with reference to the accompanying drawings.

First Embodiment

Figure 1:
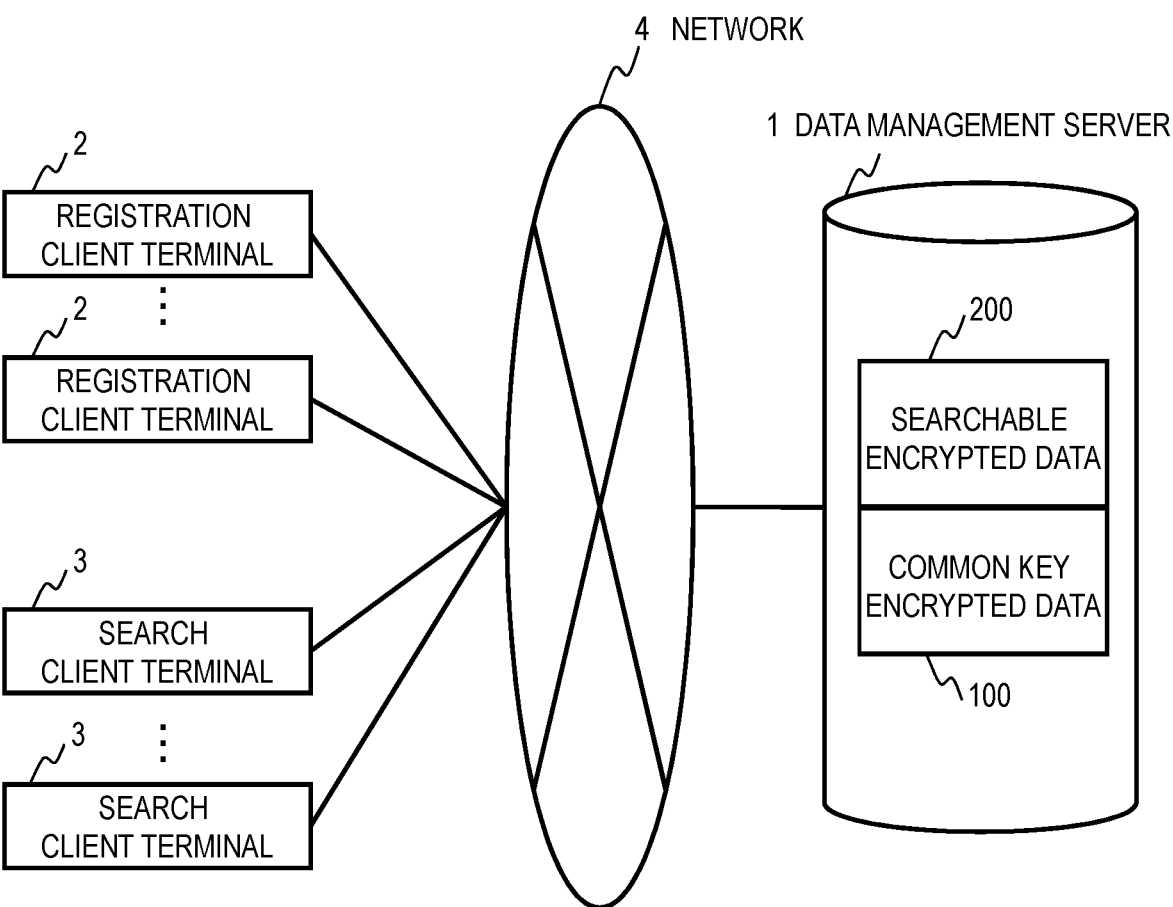
FIG. 1 is a diagram for illustrating a configuration of a data file encryption and transmission/reception system according to a first embodiment of this invention.

FIG. 1 is a diagram for illustrating a configuration of a data file encryption and transmission/reception system according to a first embodiment of this invention.
<System Configuration>

The data file encryption and transmission/reception system according to the first embodiment includes registration client terminals 2, search client terminals 3, and a data management server 1.

The devices forming the data file encryption and transmission/reception system are coupled such that each device can transmit and receive information via a network 4. As a type of the network 4, a wide area network (WAN), a local area network (LAN), and the like are conceivable. Moreover, a coupling method of the network 4 may be a wired type or a wireless type.

The data file encryption and transmission/reception system divides, in order to maintain both of high speed and security performance, data to be registered into two pieces of plaintext data in accordance with a nature of the data. The data file encryption and transmission/reception system encrypts one piece of plaintext data in accordance with a common key encryption method having high encryption processing speed, and further encrypts the other piece of plaintext data in accordance with a searchable encryption method having high security performance. In this configuration, in order to maintain the high speed, it is preferred that an extent of the application of the searchable encryption method be minimized.

In the first embodiment, a data file is encrypted in accordance with the common key encryption method, and a common key used for the encryption of the data file, an initial vector, and an association ID are encrypted in accordance with the searchable encryption method. However, actual implementation of the data file encryption and transmission/reception system is not limited to this example.

The association ID is an identifier which associates common key encrypted data 100 encrypted in accordance with the common key encryption method and searchable encrypted data 200 encrypted in accordance with the searchable encryption method with each other. Necessity of encryption of the association ID is low, and hence the association ID may be added as a plaintext to one of the two pieces of encrypted data. Moreover, as the searchable encryption method, it is only required to apply a publicly-known or well-known technology such as the technology as described in JP 2012-123614 A, and hence the searchable encryption method is not described in detail.

The registration client terminal 2 generates the common key encrypted data 100 from the data file in plaintext through use of the initial vector and the common key generated in accordance with the common key encryption method. Moreover, the registration client terminal 2 generates the association ID for associating the encrypted data generated in accordance with the common key encryption method and the encrypted data generated in accordance with the searchable encryption method with each other.

In the first embodiment, there is described a case in which the registration client terminal 2 generates the association ID, but the association ID may be issued by the data management server 1.

After that, the registration client terminal 2 applies the searchable encryption technology through use of a user secret key acquired in advance, to thereby generate the searchable encrypted data 200 in accordance with a probabilistic encryption method from data including the common key, the association ID, the initial vector, and a file name, and registers the common key encrypted data and the searchable encrypted data 200 in the data management server 1.

In this case, the probabilistic encryption method is an encryption algorithm for generating, from plaintext data, random encrypted data in which equivalence relations and magnitude relations are concealed. In the probabilistic encryption method, a plaintext and a ciphertext have a one-to-many correspondence.

Moreover, search by a file name of the data file to be registered in the data management server 1 or a keyword for search which a user can optionally set can be implemented by applying the searchable encryption to the file name, the keyword, and the like.

The search client terminal 3 acquires the searchable encrypted data 200 from the data management server 1, and decrypts the initial vector, the common key, and the association ID. The search client terminal 3 decrypts the common key encrypted data 100 identified by the association ID through use of the decrypted initial vector and common key.

When the file name of the data file to be acquired or the keyword for the search which the user can optionally set is set, the searchable encrypted data 200 can also be searched by those pieces of data.

In this case, the search client terminal 3 can generate an encrypted search keyword from a search keyword (the file name or the optional keyword in the plaintext data form) in accordance with the probabilistic encryption method, and transmit, to the data management server 1, a search request including the encrypted search keyword for output, to thereby execute the search.

<Data Management Server>

Figure 2:
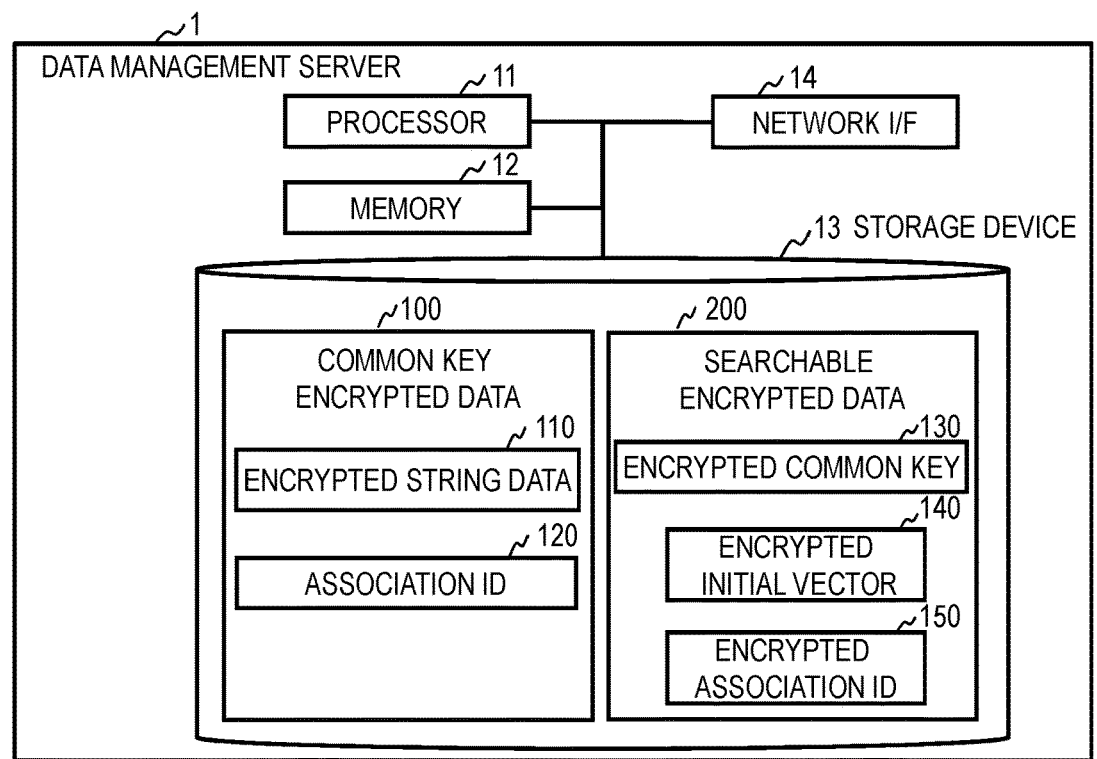
FIG. 2 is a block diagram for illustrating an example of a configuration of the data management server according to the first embodiment of this invention.

FIG. 2 is a block diagram for illustrating an example of a configuration of the data management server 1. The data management server 1 is a computer including a processor 11, a memory 12, a storage device 13, and a network interface 14.

In the storage device 13, the common key encrypted data 100 and the searchable encrypted data 200 are stored. The common key encrypted data 100 includes encrypted string data 110. The searchable encrypted data 200 includes encrypted common keys 130, encrypted initial vectors 140, and encrypted association IDs 150. The common key encrypted data 100 and the searchable encrypted data 200 are stored in a database form in the storage device 13.

Software for managing the common key encrypted data 100 and the searchable encrypted data 200 is loaded onto the memory 12 to be executed by the processor 11. As the software for managing each piece of data stored in the storage device 13, for example, a database management system or the like can be employed.

The network interface 14 is coupled to the network 4, and hence is coupled to the one or more registration client terminals 2 and the one or more search client terminals 3, to thereby receive requests for the registration of and the search for data and the like.

The data management server 1 stores the searchable encrypted data 200 encrypted through use of the searchable cryptograph technology in a form which cannot be decrypted within the data management server 1.

The data management server 1 stores the common key encrypted data 100 encrypted in accordance with the common key encryption method and the searchable encrypted data 200 encrypted in accordance with the searchable encryption method, and searches for the common key encrypted data 100 and the searchable encrypted data 200 corresponding to a search request.

Moreover, a data file may be divided into a header or a part of the data file and the rest thereof, and only the header or the part may be encrypted by searchable cryptography, and may be stored in the data management server 1. With this configuration, the data management server 1 can further increase the speed of the processing while maintaining the security performance.

In FIG. 1, one data management server 1 is illustrated, but the data management server 1 may physically be divided into a database which stores the searchable encrypted data 200 and outputs the data without decrypting the data in the database, and a database which stores the common key encrypted data 100, and to which a standard encryption technology is applied (that is, encrypted data is stored in a storage device, but decrypted data is output in a datacenter).

Moreover, the searchable encrypted data 200 may not be decrypted in the database which stores the searchable encrypted data 200, and a schema of a database which outputs data may be divided, to thereby store the common key encrypted data 100 and the searchable encrypted data 200.

<Registration Client Terminal>

Figure 3:
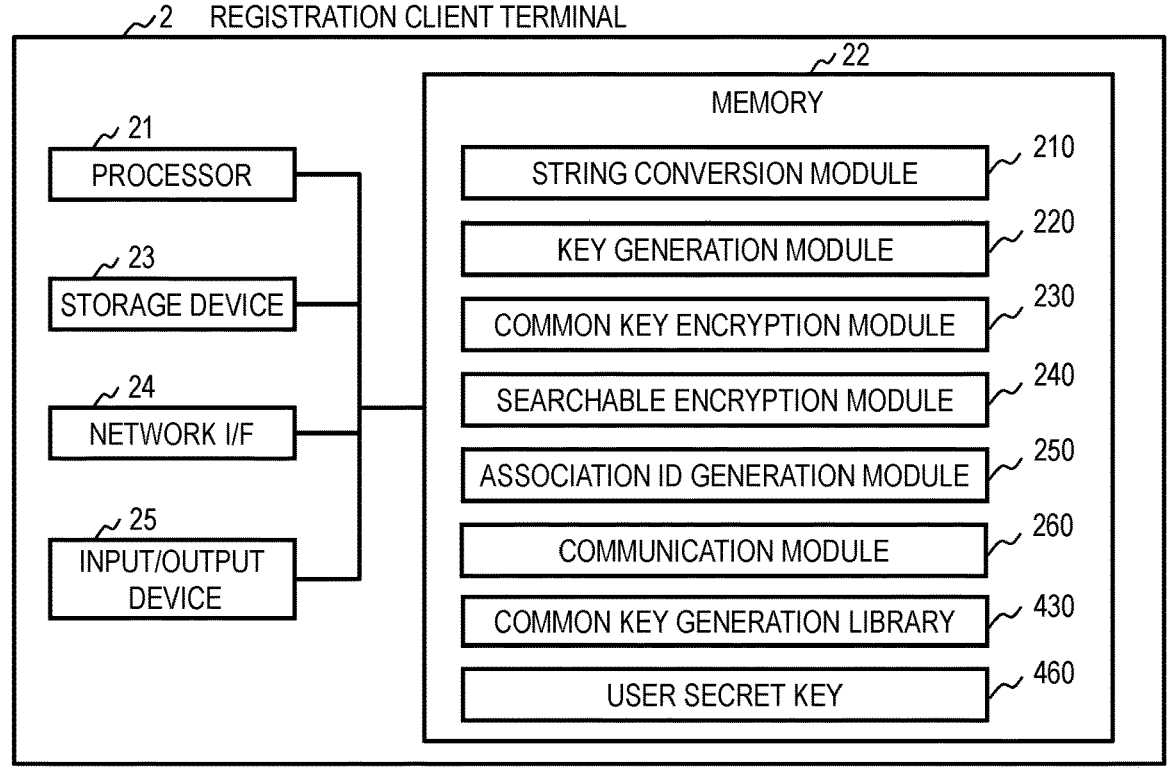
FIG. 3 is a block diagram for illustrating an example of a configuration of the registration client terminal according to the first embodiment of this invention.

FIG. 3 is a block diagram for illustrating an example of a configuration of the registration client terminal 2. The registration client terminal 2 is a computer including a processor 21, a memory 22, a storage device 23, a network interface 24, and an input/output device 25.

A string conversion module 210, a key generation module 220, a common key encryption module 230, a searchable encryption module 240, an association ID generation module 250, and a communication module 260 are loaded onto the memory 22 as programs to be executed by the processor 21. Moreover, a common key generation library 430 set in advance and a user secret key 460 acquired in advance are stored in the memory 22.

The processor 21 operates as the function modules which provide predetermined functions by executing processing in accordance with the programs of the respective function modules. For example, the processor 21 executes processing in accordance with a string conversion program, to thereby function as the string conversion module 210. The same applies to other programs. Further, the processor 21 also operates as a function module which provides respective functions of a plurality of pieces of processing executed by each program. The computer and the computer system are a device and a system, respectively, including those function modules. Details of each function module are described later.

The input/output device 25 is formed of an input device such as a keyboard and a mouse or a touch panel and an output device such as a display. The network interface 24 is coupled to the network 4, and communicates to/from other devices.

<Search Client Terminal>

Figure 4:
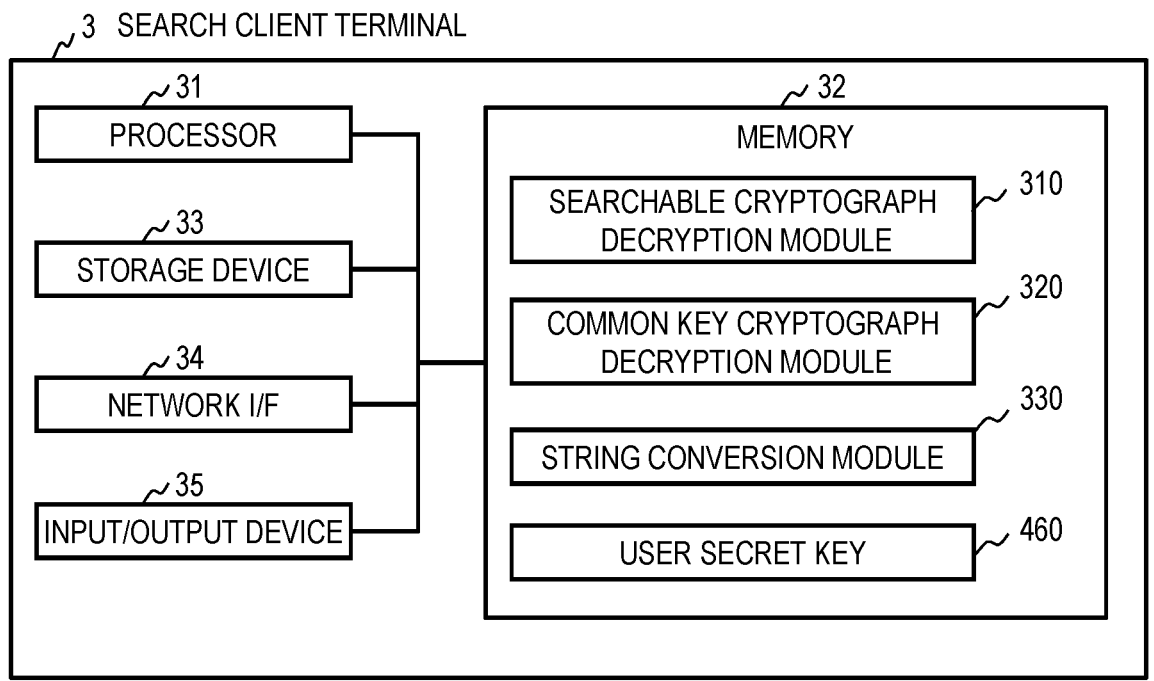
FIG. 4 is a block diagram for illustrating an example of a configuration of the search client terminal according to the first embodiment of this invention.

FIG. 4 is a block diagram for illustrating an example of a configuration of the search client terminal 3. The search client terminal 3 is a computer including a processor 31, a memory 32, a storage device 33, a network interface 34, and an input/output device 35.

A searchable cryptograph decryption module 310, a common key cryptograph decryption module 320, and a string conversion module 330 are loaded onto the memory 32 as programs to be executed by the processor 31. Moreover, the user secret key 460 acquired in advance is stored in the memory 32.

The processor 31 operates as the function modules which provide predetermined functions by executing processing in accordance with the programs of the respective function modules. For example, the processor 31 executes processing in accordance with a searchable cryptograph decryption program, to thereby function as the searchable cryptograph decryption module 310. The same applies to other programs. Further, the processor 31 also operates as a function module which provides respective functions of a plurality of pieces of processing executed by each program. The computer and the computer system are a device and a system, respectively, including those function modules. Details of each function module are described later.

The input/output device 35 is formed of an input device such as a keyboard and a mouse or a touch panel and an output device such as a display. The network interface 34 is coupled to the network 4, and communicates to/from other devices.

<Registration Processing>

Figure 5:
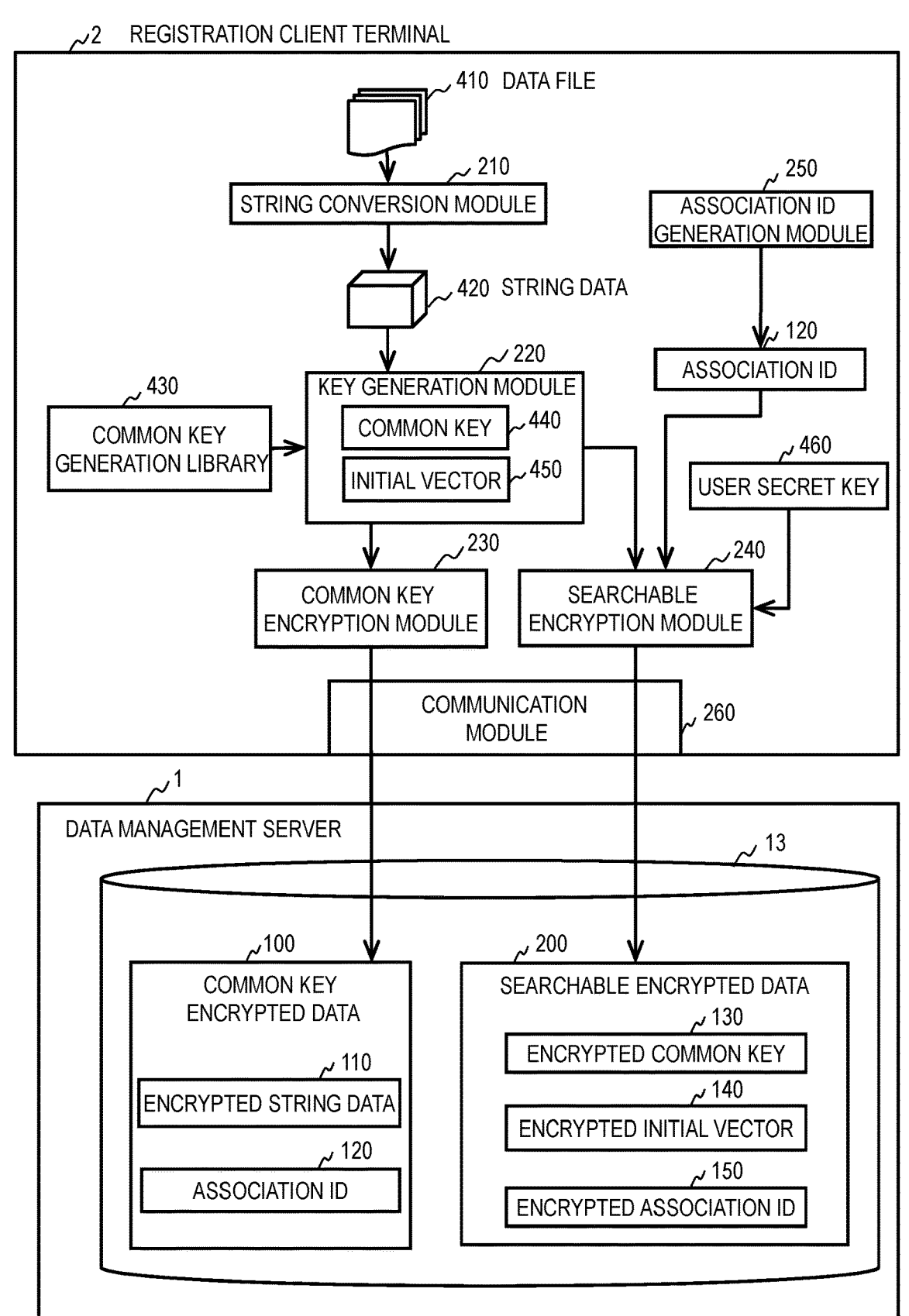
FIG. 5 is a diagram for illustrating an example of an overview of registration processing for a data file according to the first embodiment of this invention.
Figure 6:
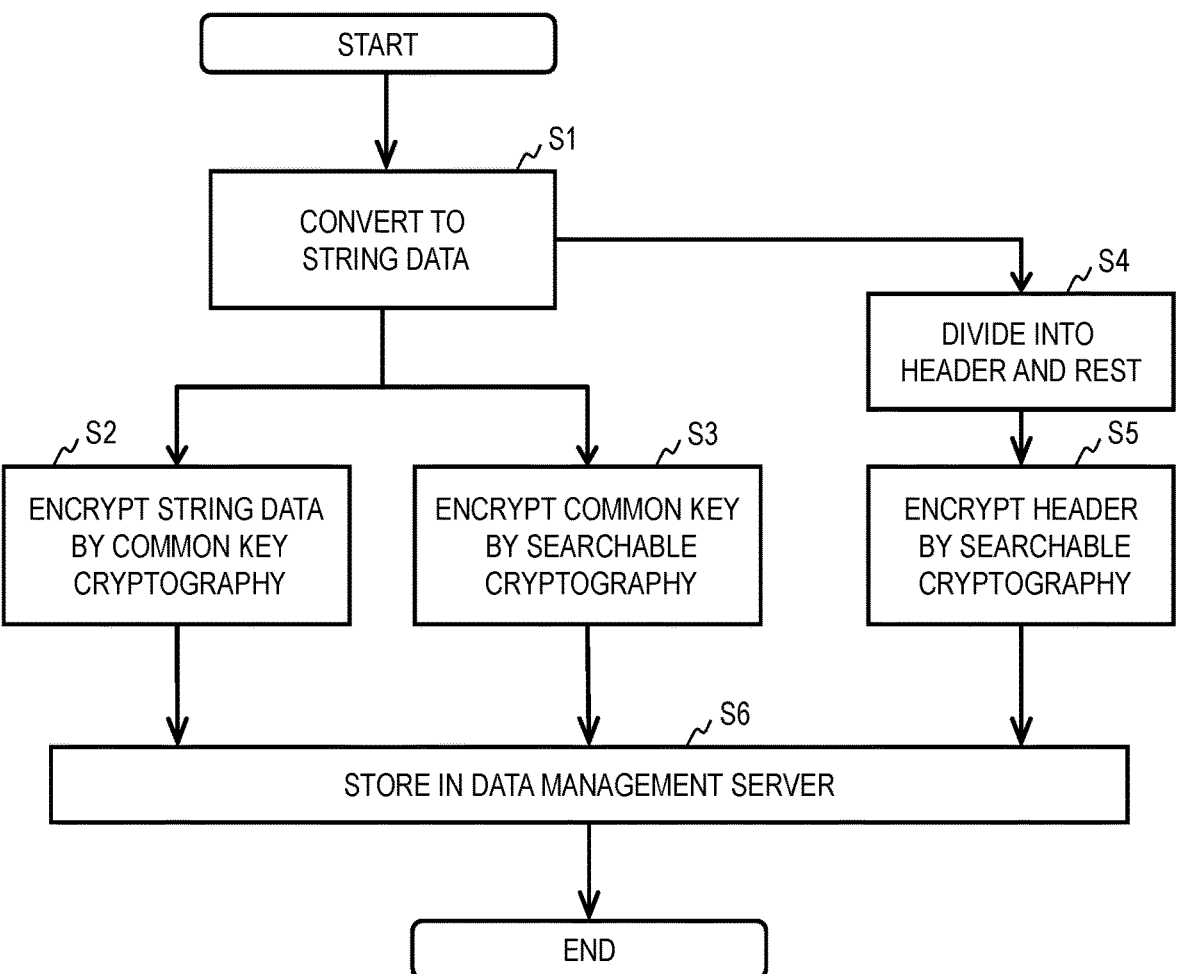
FIG. 6 is a flowchart for illustrating an example of the registration processing for a data file in the data file encryption and transmission/reception system according to the first embodiment of this invention.

FIG. 5 is a diagram for illustrating an example of an overview of registration processing for a data file in this invention. FIG. 6 is a flowchart for illustrating an example of the registration processing for a data file in the data file encryption and transmission/reception system. Description is now given with reference to FIG. 5 and FIG. 6.

The registration client terminal 2 includes the string conversion module 210, the common key generation library

430, the common key encryption module 230, the searchable encryption module 240, the association ID generation module 250, and the communication module 260, and holds the user secret key 460 and a data file 410. The data file 410 is data input by a user of the registration client terminal 2.

The string conversion module 210 receives the data file 410, and then converts the data file 410 to a predetermined string such as that in the Base 64 format or the like, to thereby generate a string data 420 in plaintext (Step S1 of FIG. 6).

When the string data 420 of the data file 410 is newly encrypted to be registered in the data management server 1, the registration client terminal 2 issues the association ID for associating the common key encrypted data 100 and the searchable encrypted data 200 with each other. In the first embodiment, the case in which the registration client terminal 2 generates the association ID is described, but the association ID may be issued by the data management server 1.

The data file encryption and transmission/reception system has a feature that the data file encryption and transmission/reception system divides, in order to maintain both of the high speed and the security performance, data to be registered in the data management server 1 into two pieces of plaintext data in accordance with the nature of the data, encrypts one piece of plaintext data in accordance with the common key encryption method having a high encryption processing speed, and further encrypts the other piece of plaintext data in accordance with the searchable encryption method having high security performance.

In the first embodiment, there is described the example in which when the input data file 410 is to be encrypted, the registration client terminal 2 divides the information into the string data 420 and the information required for the decryption, encrypts the string data 420 with the common key, and encrypts the information required for the decryption through use of the searchable cryptograph. However, the configuration is not limited to this example. As described later, a part (keywords) of the string data 420, the file name of the data file 410, and the like may be encrypted through use of the searchable cryptograph.

When the input data file 410 is to be encrypted, it is only required to set, in advance by the registration client terminal 2, a method of dividing the information to be encrypted and applying the common key encryption and the searchable encryption. For example, the data to be encrypted may be divided into first input information and second input information. The first input information may be encrypted by the common key encryption module 230. The second input information may be encrypted by the searchable encryption module 240.

In the first embodiment, the registration client terminal 2 encrypts the string data 420 of the data file 410 in accordance with the common key encryption method (Step S2 of FIG. 6), and encrypts the initial vector 450 and the common key 440 used for the encryption of the string data 420 of the data file 410 and the association ID 120 in accordance with the searchable encryption method (Step S3 of FIG. 6).

After that, the registration client terminal 2 registers, in the data management server 1, the common key encrypted data 100 encrypted with the common key and the searchable encrypted data 200 encrypted thought use of the searchable encryption. The configuration is not limited to the above-mentioned example when this data file encryption and transmission/reception system is to actually be implemented.

Moreover, as the method for the division into the common key encrypted data 100 and the searchable encrypted data 200, the following method may be used. The registration client terminal 2 divides, for example, the data file 410 into two pieces which are the header or a part of the data file 410 and the rest thereof (Step S4 of FIG. 6).

The registration client terminal 2 applies the searchable encryption to the header of the data file 410 or a part of the string data 420 and the association ID 120 (Step S5 of FIG. 6), and stores, as a set, the encrypted part of the string data 420 and association ID 120 in the data management server 1. The rest of the data and the association ID 120 (plaintext) are stored, as a set, in the data management server 1. As a result, a speed higher than that in the first embodiment can be achieved while the security performance is maintained.

When the registration client terminal 2 receives a registration instruction for the data file 410 from the user via the input/output device 25, the registration client terminal 2 generates the encrypted string data 110 from the string data 420 in plaintext in accordance with the common key encryption method. Specifically, the following processing is executed.

The key generation module 220 of the registration client terminal 2 generates the common key 440 which changes every time and the initial vector 450 through use of the common key generation library 430. The key generation module 220 generates the common key 440 which changes every time and the initial vector 450, to thereby achieve encryption and randomization through use of the method not based on a constant law.

The initial vector 450 is a unique random number (pseudo random number) to be added when the string data 420 of the data file 410 is to be encrypted, and is required to decrypt the encrypted string. Thus, it is preferred to encrypt the initial vector 450 in accordance with the searchable encryption method having the high security as in the common key 440.

The common key encryption module 230 encrypts the string data 420 through use of the initial vector 450 and the common key 440, to thereby generate the common key encrypted data 100 including the encrypted string data 110.

The registration client terminal 2 generates the searchable encrypted data 200 from the common key 440, the initial vector 450, and the association ID 120 generated in plaintext in accordance with the searchable encryption method (Step S3 of FIG. 6). Specifically, the following processing is executed.

The searchable encryption module 240 applies the searchable encryption technology to encrypt the common key 440, the initial vector 450, and the association ID 120 in accordance with a probabilistic encryption method which uses a mask using the user secret key 460, a pseudo random number, and a homomorphic function, to thereby generate the searchable encrypted data 200 including the encrypted common key 130, the encrypted initial vector 140, and the encrypted association ID 150.

The user secret key 460 is assigned in advance to each user who uses the registration client terminal 2 and the search client terminal 3. After the user secret key 460 has once been passed and then received, the transmission and the reception of the user secret key 460 does not occur. It is thus possible to suppress a risk of leakage of the user secret key 460.

The association ID generation module 250 generates the association ID 120 as an identifier for associating the common key encrypted data 100 and the searchable encrypted data 200 with each other, and inputs the generated association ID 120 to the searchable encryption module 240.

The communication module 260 forms the set of the common key encrypted data 100 generated by the common key encryption module 230 and the searchable encrypted data 200 generated by the searchable encryption module 240, and transmits the formed set to the data management server 1, to thereby register the set.

In the first embodiment, a set of the encrypted common key 130, the encrypted initial vector 140, and the encrypted association ID 150 is the searchable encrypted data 200.

The registration client terminal 2 forms the set of the common key encrypted data 100 and the searchable encrypted data 200, and transmits the set to the data management server 1 (Step S6 of FIG. 6).

Moreover, in the data management server 1, the search by the file name or the keyword can be achieved by the registration client terminal 2 applying, in advance, the searchable encryption to attribute information (such as the file name of the data file 410 to be acquired or the keyword for the search which the user can optionally set), and registering the encrypted attribute information in the data management server 1.

The above-mentioned processing steps of Step S4 and Step S5 are not essential processing steps, but the search can be executed while a part of the data file 410 or a component (keyword or attribute information) thereof remains encrypted by dividing the part or the component of the data file 410 and including the part or the component in the searchable encrypted data 200.

<Search Processing>

Figure 7:
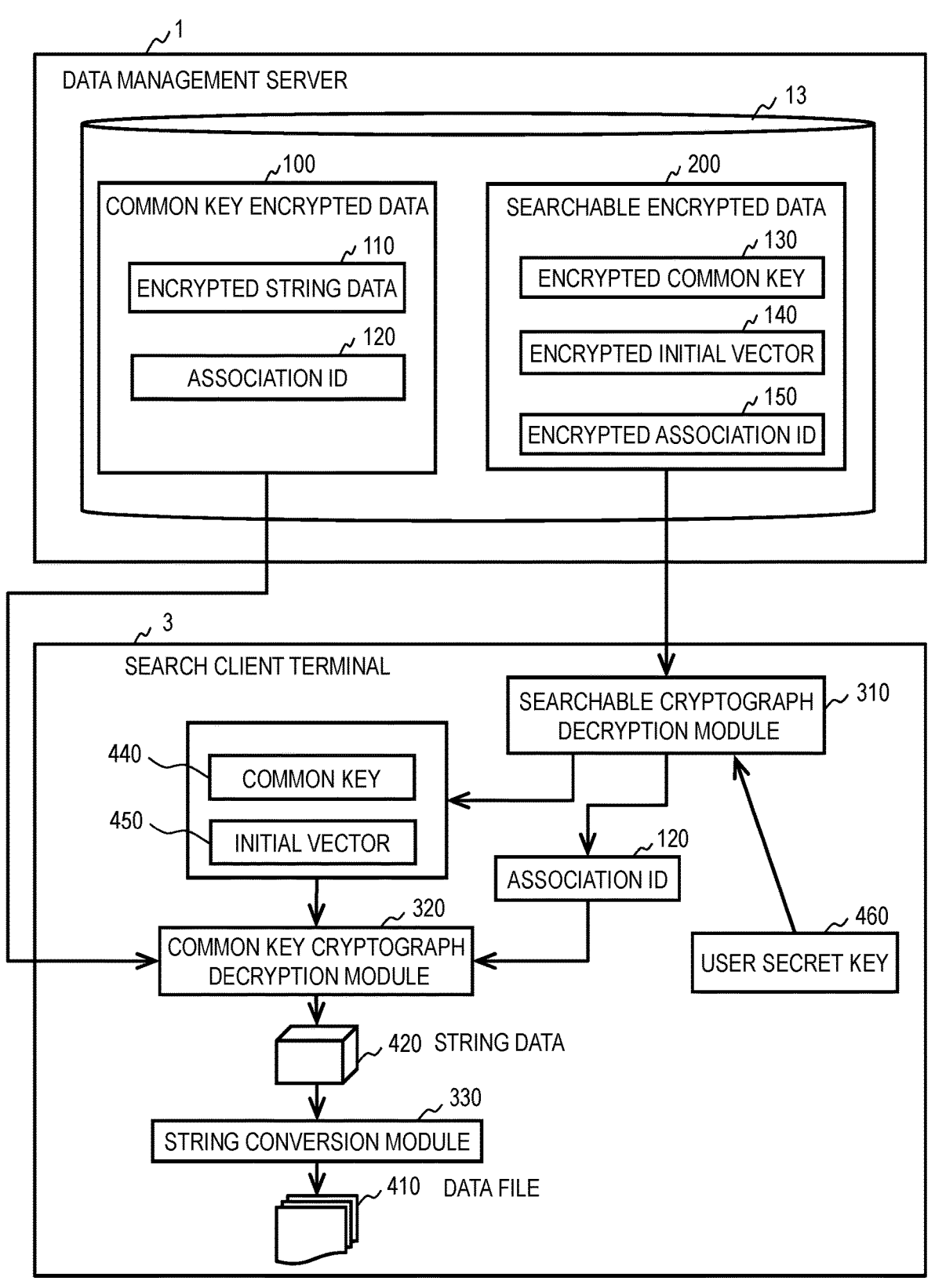
FIG. 7 is a diagram for illustrating an example of an overview of search processing for the data file according to the first embodiment of this invention.
Figure 8:
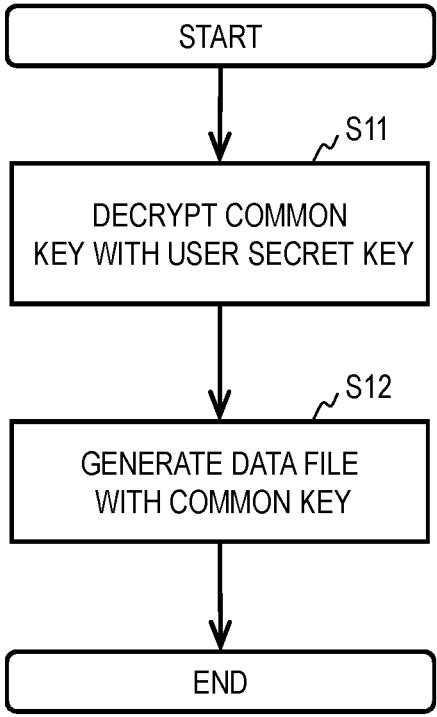
FIG. 8 is a flowchart for illustrating an example of the search processing for the data file according to the first embodiment of this invention.

FIG. 7 is a diagram for illustrating an example of an overview of search processing for the data file 410 according to this invention. FIG. 8 is a flowchart for illustrating an example of the search processing for the data file 410 in this system. Description is now given with reference to FIG. 7 and FIG. 8.

For downloading from the data management server 1, processing basically opposite to the procedure of the upload is executed, to thereby decrypt the encrypted data.

As illustrated in FIG. 4, the search client terminal 3 includes the string conversion module 330, the searchable cryptograph decryption module 310, and the common key cryptograph decryption module 320, and holds the user secret key 460.

The data management server 1 holds the common key encrypted data 100 which is the encrypted string data and the searchable encrypted data 200 which is the set of the encrypted common key 130, the encrypted initial vector 140, and the encrypted association ID 150.

The search client terminal 3 acquires the searchable encrypted data 200 from the data management server 1. In this state, when the searchable encryption is applied to the attribute information (such as the file name of the data file 410 to be acquired or the keyword for the search which the user can optionally set), the search by the file name or the keyword can also be executed.

The search client terminal 3 decrypts, in the searchable cryptograph decryption module 310, the acquired searchable encrypted data 200 with the user secret key 460 (Step S11 of FIG. 8). The decrypted data includes the common key 440, the initial vector 450, the association ID 120, and other attribute information such as the file name when the attribute information is set.

Moreover, the search client terminal 3 executes the decryption in a procedure similar to that described above also when the searchable encryption has been applied to the header or a part of the data file 410.

The common key cryptograph decryption module 320 of the search client terminal 3 searches for and acquires the common key encrypted data 100 by the decrypted association ID 120, and decrypts the acquired common key encrypted data 100 with the decrypted common key 440 and initial vector 450. The decrypted data includes the string data 420.

Finally, the string conversion module 330 generates the data file 410 from the string data 420 (Step S12 of FIG. 8).

As described above, in the first embodiment, the data is divided into the two pieces of data in accordance with the nature of the data to be registered in the data management server 1. The one piece of data is encrypted in accordance with the common key encryption method having the high encryption processing speed. The other piece of data is further encrypted in accordance with the searchable encryption method having the high security performance. Consequently, the encryption, the decryption, the transmission, and the reception of the data file which maintain both of the high speed and the security performance of the processing can be achieved only through the software processing without using dedicate hardware.

Moreover, the registration client terminal 2 generates the common key 440 which changes every time and the initial vector 450, which is the unique random number (pseudo random number) to be added when the encryption is executed, to thereby execute the encryption in accordance with the common key encryption method. After that, the registration client terminal 2 applies the searchable encryption technology. The searchable encryption technology is the probabilistic encryption method which uses the mask using the user secret key 460, the pseudo random number, and the homomorphic function, and has such a nature that the same data or query is encrypted to a ciphertext which changes every time (not based on a constant law). All of the encrypted data is randomized in accordance with the combination of the common key encryption method and the searchable encryption method, thereby being capable of ensuring high security.

The user secret key 460 used for the searchable encryption method is assigned to each user who uses the registration client terminal 2 or the search client terminal 3. After the user secret key 460 has once been passed and then received, the transmission and the reception of the user secret key does not occur. It is thus possible to suppress the risk of the leakage of the user secret key 460 compared with the related art in which a random number (pseudo random number) and a numerical value for random number generation are transmitted and received each time data is encrypted.

The searchable encryption method uses the common key encryption method, and hence the registration client terminal 2 and the search client terminal 3 can execute the encryption and decryption with the own user secret key 460. Thus, the registration, the search, and the acquisition of the data file by the same user can be achieved, which cannot be achieved by the public key cryptography having different keys for the encryption and the decryption.

Moreover, in the data management server 1, search by the file name and the keyword can be achieved by the registration client terminal 2 applying, in advance, the searchable encryption to the attribute information (such as the file name of the data file 410 to be acquired, and the keyword for the search which the user can optionally set), and registering the encrypted attribute information in the data management server 1.

Figure 9:
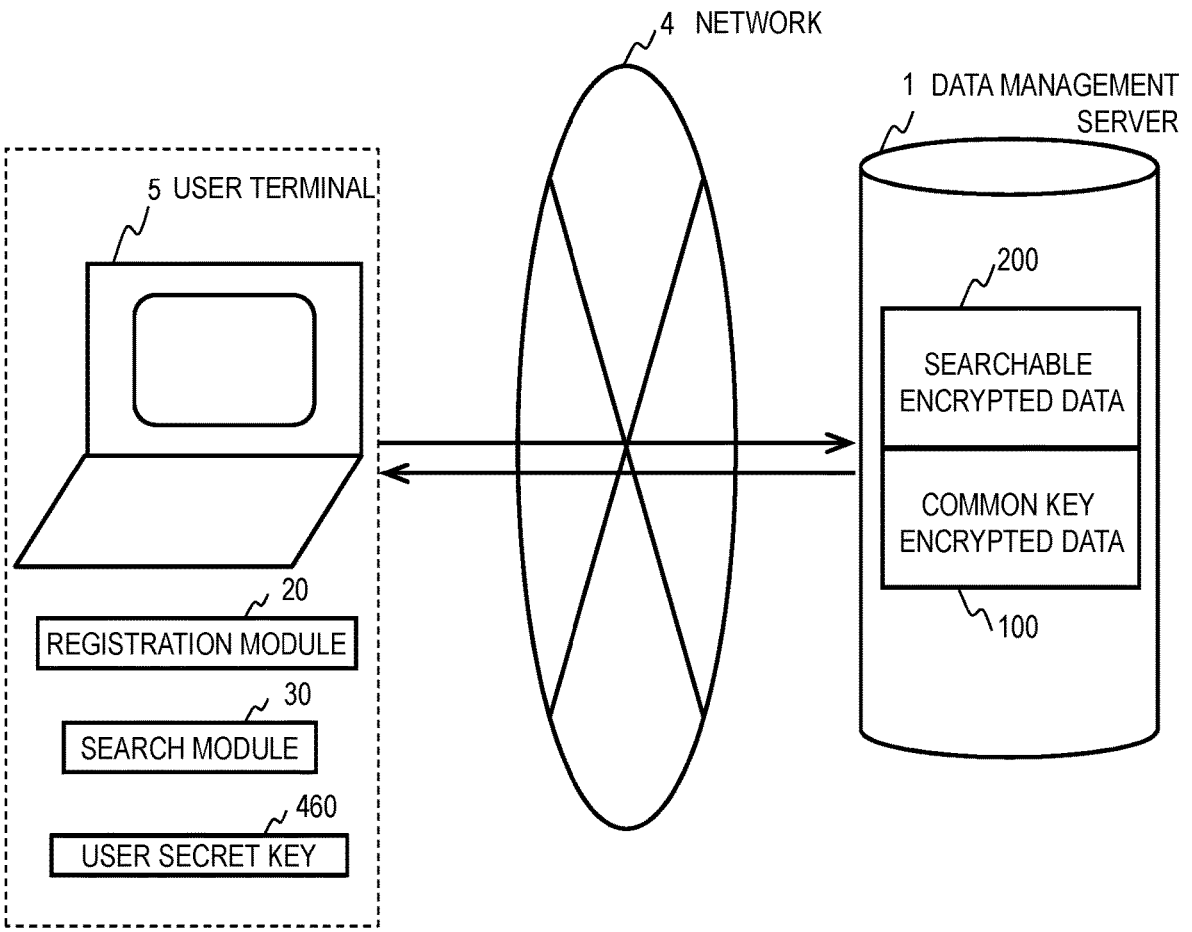
FIG. 9 is a diagram for illustrating a modification example of the first embodiment in which the functions of the registration client terminal according to the first embodiment of this invention.

FIG. 9 is a diagram for illustrating a modification example of the first embodiment in which the functions of the registration client terminal 2 and the search client terminal 3 are implemented by one user terminal 5. The user terminal 5 is a computer including a processor, a memory, and a communication unit, which are not shown.

The user terminal 5 includes a registration module 20 having the same function as that of the above-mentioned registration client terminal 2 and a search module 30 having the same function as that of the above-mentioned search client terminal 3. The user terminal 5 executes the encryption and the decryption with the user secret key 460 assigned to a user of this user terminal 5. The rest of the configuration is the same as that of the above-mentioned first embodiment.

As illustrated in FIG. 3, the registration module 20 includes the string conversion module 210, the key generation module 220, the common key encryption module 230, the searchable encryption module 240, the association ID generation module 250, the communication module 260, the common key generation library 430, and the user secret key 460.

As illustrated in FIG. 4, the search module 30 includes the searchable cryptograph decryption module 310, the common key cryptograph decryption module 320, the string conversion module 330, and the user secret key 460.

Second Embodiment

Figure 10:
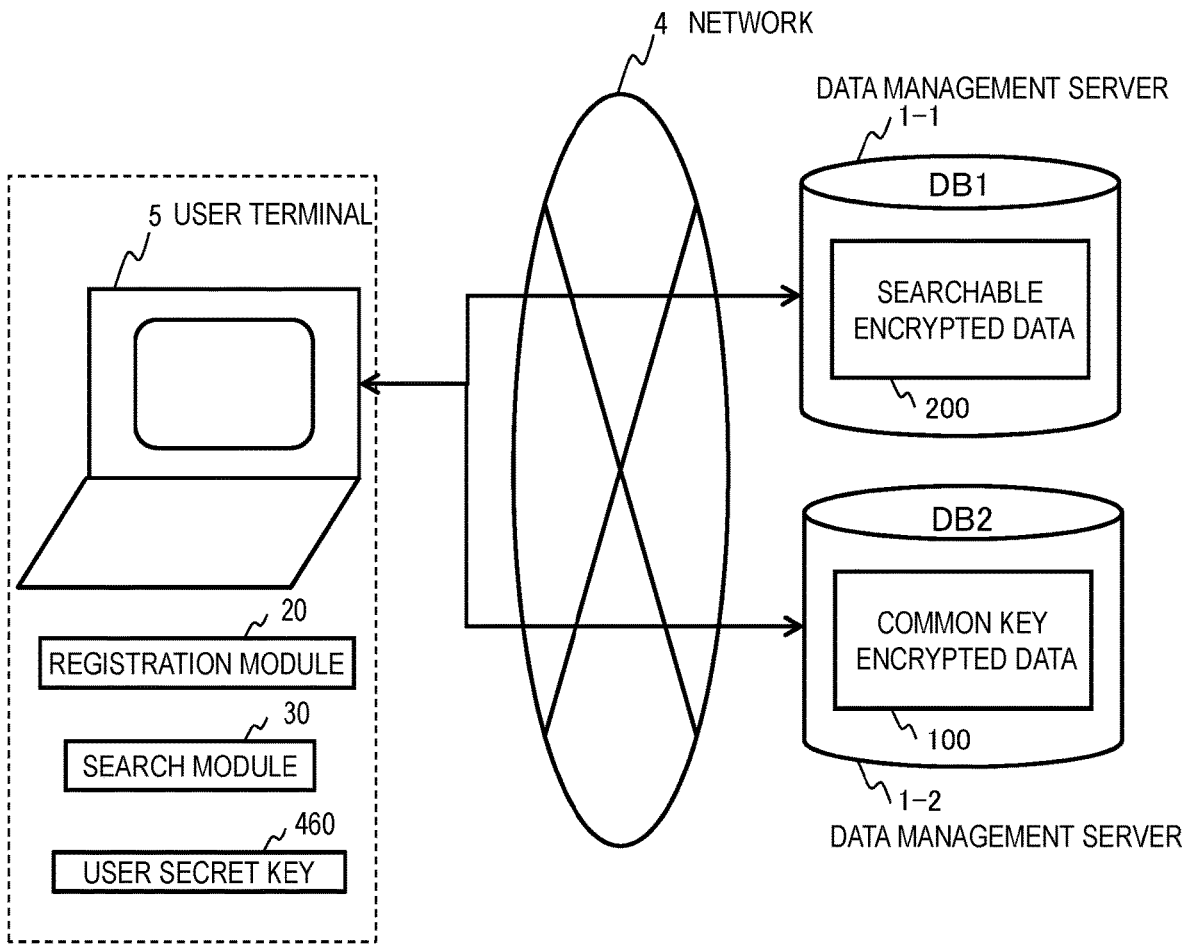
FIG. 10 is a block diagram for illustrating an example of a configuration of a data file encryption and transmission/reception system according to a second embodiment.
Figure 11:
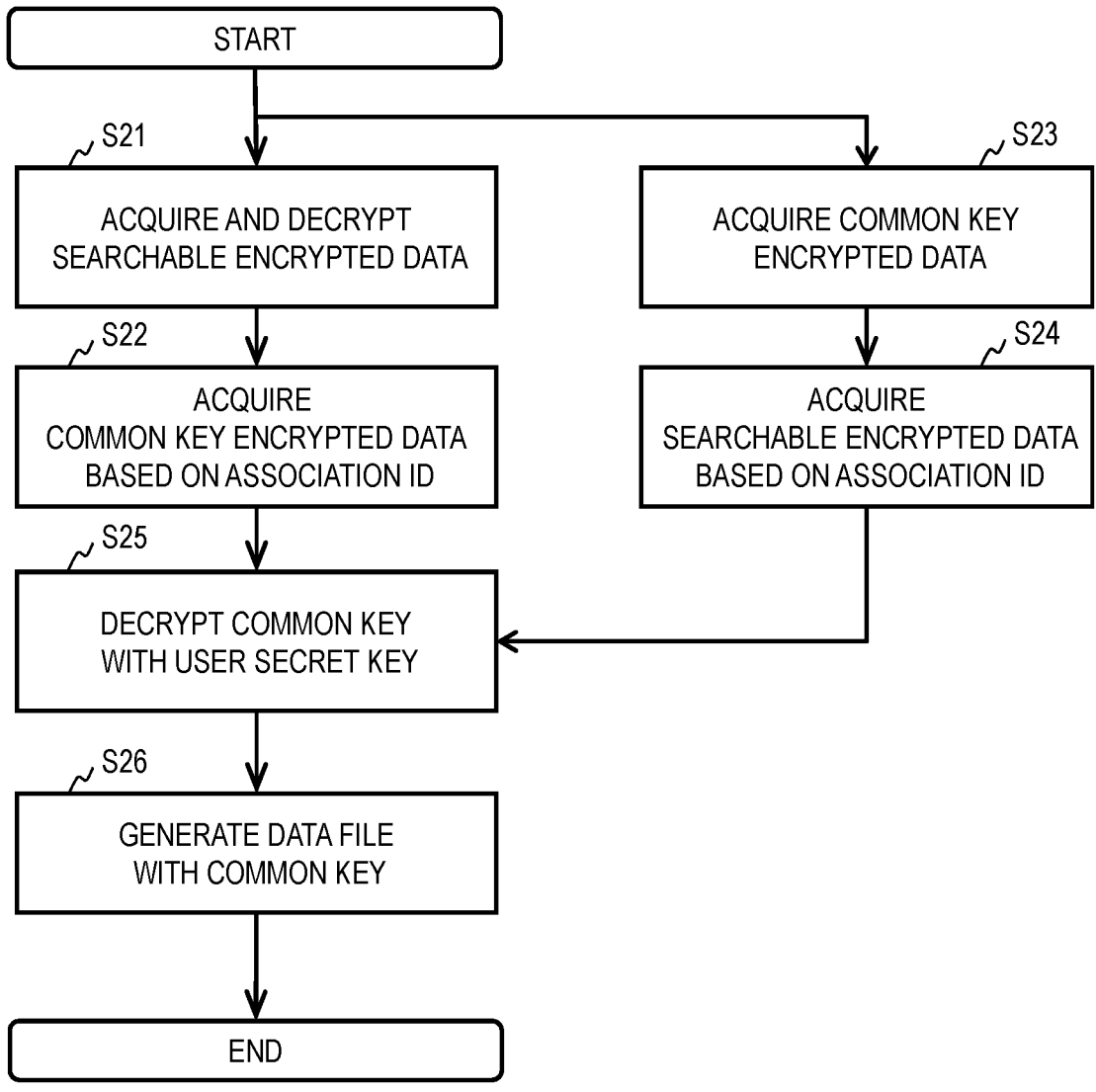
FIG. 11 is a flowchart for illustrating an example of search processing for the data file 410 executed in the data file encryption and transmission/reception system according to the second embodiment of this invention.

FIG. 10 and FIG. 11 show a second embodiment of this invention. In the second embodiment, there is described an example in which the data management server 1 in the first embodiment is divided in accordance with the types of stored data.

In the second embodiment, the searchable encrypted data 200 and the common key encrypted data 100 are stored in a data management server 1-1 and a data management server 1-2, respectively, in a distributed manner. Thus, a configuration other than processing relating thereto is the same as that in the first embodiment.

FIG. 10 is a block diagram for illustrating an example of a configuration of a data file encryption and transmission/ reception system according to the second embodiment. The data file encryption and transmission/reception system according to the second embodiment includes the user terminal 5 described in the modification example of the first embodiment, the data management servers 1-1 and 1-2, and the network 4.

The data management server 1-1 stores the searchable encrypted data 200 encrypted through use of the searchable cryptograph technology in the form which cannot be decrypted within the data management server 1-1. The data management server 1-2 manages a database which stores standard plaintext data. The data management server 1-2 can manage a database to which a standard encryption technology is applied (that is, the encrypted data is stored in a storage device, but decrypted data is output in a datacenter).

In the second embodiment, the registration module 20 converts the data file 410 to the string data 420, and then encrypts the string data 420 in accordance with the common key encryption method. After that, the registration module 20 forms a set of the common key encrypted data 100 and the association ID 120 (plaintext), and stores the formed set in the data management server 1-2.

After that, the common key 440 used to encrypt the data file 410 is encrypted in accordance with the searchable encryption method. The encrypted common key 440 and the association ID 120 are formed into a set, and are stored in the searchable encrypted data 200 of the data management server 1-1. In this case, the association ID 120 may be encrypted in accordance with the searchable encryption method.

The data stored in the data management server 1-1 and the data stored in the data management server 1-2 can be associated with each other through use of the association ID 120. The encrypted common key 130 stored in the data management server 1-1 is obtained by encrypting the common key 440 in accordance with the method (probabilistic encryption method) not based on a constant law, and hence is randomized.

Moreover, the user secret key 460 used for the encryption and the decryption is held in only the user terminal 5 used by a registrant and an applicant. Thus, even when the data stored in the data management server 1-1 and the data stored in the data management server 1-2 are coupled to each other in the datacenter, the data file 410 cannot be decrypted. Thus, the data file 410 can more safely be managed than in the first embodiment.

Moreover, in addition to the data management server 1-2, the data can more safely be managed by applying an information management system of JP 2015-187828 A to the data file 410, to thereby store the data file 410 such that the data file 410 is divided into information which can identify individuals and information which alone cannot identify individuals.

The second embodiment is an information management system in which the data management server 1-1 (first database) and the data management server 1-2 (second database) are provided in one or a plurality of datacenters. The information management system has a feature that the data management server 1-1 (first database) stores data encrypted through use of the searchable encryption technology in the form which cannot be decrypted within the datacenter, and the data management server 1-2 (second database) stores the data associated with the data stored in the data management server 1-1 (first database).

It is possible to allow only a user having viewing authority to acquire the encrypted file by providing a configuration in which an ID uniquely identifying a target person and the encrypted data file 410 are stored in the data management server 1-2, and the ID uniquely identifying the target person and the association ID 120 are stored in the data management server 1-1.

Moreover, the data file 410 may be divided into two pieces which are the header or a part of the data file 410 and the rest. The header or the part may be encrypted by searchable cryptography to be stored in the data management server 1-1. The rest may be stored in the data management server 1-2.

The data stored in the data management server 1-1 is encrypted by searchable cryptography into the random number (pseudo random number), and hence the data file 410 cannot be decrypted even when the pieces of data are coupled to each other in the datacenter. Only a part of the data file 410 is encrypted by searchable cryptography, and hence processing performance for the data registration and acquisition can be increased while the security is maintained compared with the case in which the entire data file 410 is encrypted with a common key.

FIG. 11 is a flowchart for illustrating an example of search processing for the data file 410 executed in the data file encryption and transmission/reception system according to the second embodiment.

The user terminal 5 may acquire the searchable encrypted data 200 from the data management server 1-1, and may then acquire the common key encrypted data 100 from the data management server 1-2. As another example, the user terminal 5 may acquire the common key encrypted data 100 from the data management server 1-2, and may then acquire the searchable encrypted data 200 from the data management server 1-1.

Step S21 and Step S22 indicate a method of acquiring, by the user terminal 5, the data first from the data management server 1-1. Step S23 and Step S24 indicate an example of acquiring the data first from the data management server 1-2. An application executed in the user terminal 5 selects from which one of the data management servers 1-1 and 1-2 the data is acquired first, and controls transmission of a request to each of the data management servers 1-1 and 1-2.

Moreover, the same applies to the case in which the data file 410 is divided into two pieces which are the header or a part of the data file 410 and the rest. In this case, the header or the part is encrypted by searchable cryptography into the searchable encrypted data 200, and the searchable encrypted data 200 is then stored in the data management server 1-1 and the rest is stored in the data management server 1-2.

First, description is given of the example in which the user terminal 5 first acquires the data from the data management server 1-1 as in Step S21 and Step S22. The user terminal 5 acquires the searchable encrypted data 200 from the data management server 1-1 (Step S21). When the file name of the data file 410 to be acquired or a keyword which the user can optionally set is set, the user terminal 5 can search the data management server 1-1 by such data.

The user terminal 5 decrypts the acquired searchable encrypted data 200 with the user secret key 460. The decrypted data includes the common key 440, the initial vector 450, the association ID 120, and other attribute information such as the file name when the attribute information is set (Step S21).

The user terminal 5 instructs the data management server 1-2 to search for the common key encrypted data 100 based on the association ID 120 (Step S22). The data management server 1-2 searches for the common key encrypted data including the same association ID 120, and transmits the retrieved common key encrypted data to the user terminal 5.

The user terminal 5 decrypts the transmitted common key encrypted data 100 into the data file 410 with the decrypted common key 440 and the initial vector 450 (Step S25 and Step S26).

Meanwhile, when the user terminal 5 first acquires the data from the data management server 1-2, the user terminal 5 transmits the request to the data management server 1-2, to thereby acquire the common key encrypted data 100 stored in the data management server 1-2 through search processing (Step S23).

Moreover, it is possible to allow only a user having the viewing authority to acquire the encrypted file by providing a configuration in which an ID uniquely identifying a target person and the encrypted data file 410 are stored in the data management servers 1-1 and 1-2, and the ID uniquely identifying the target person and the association ID 120 are stored in the data management server 1-2.

The user terminal 5 transmits the request to the data management server 1-1 through use of the association ID 120 acquired from the data management server 1-2, to thereby acquire the searchable encrypted data 200 stored in the data management server 1-1 through search processing (Step S24).

Through the above-mentioned processing, the search module 30 of the user terminal 5 can, as in the first embodiment, search for the searchable encrypted data 200 and the common key encrypted data 100 which are divided and stored in the data management servers 1-1 and 1-2, respectively.

Third Embodiment

Figure 12:
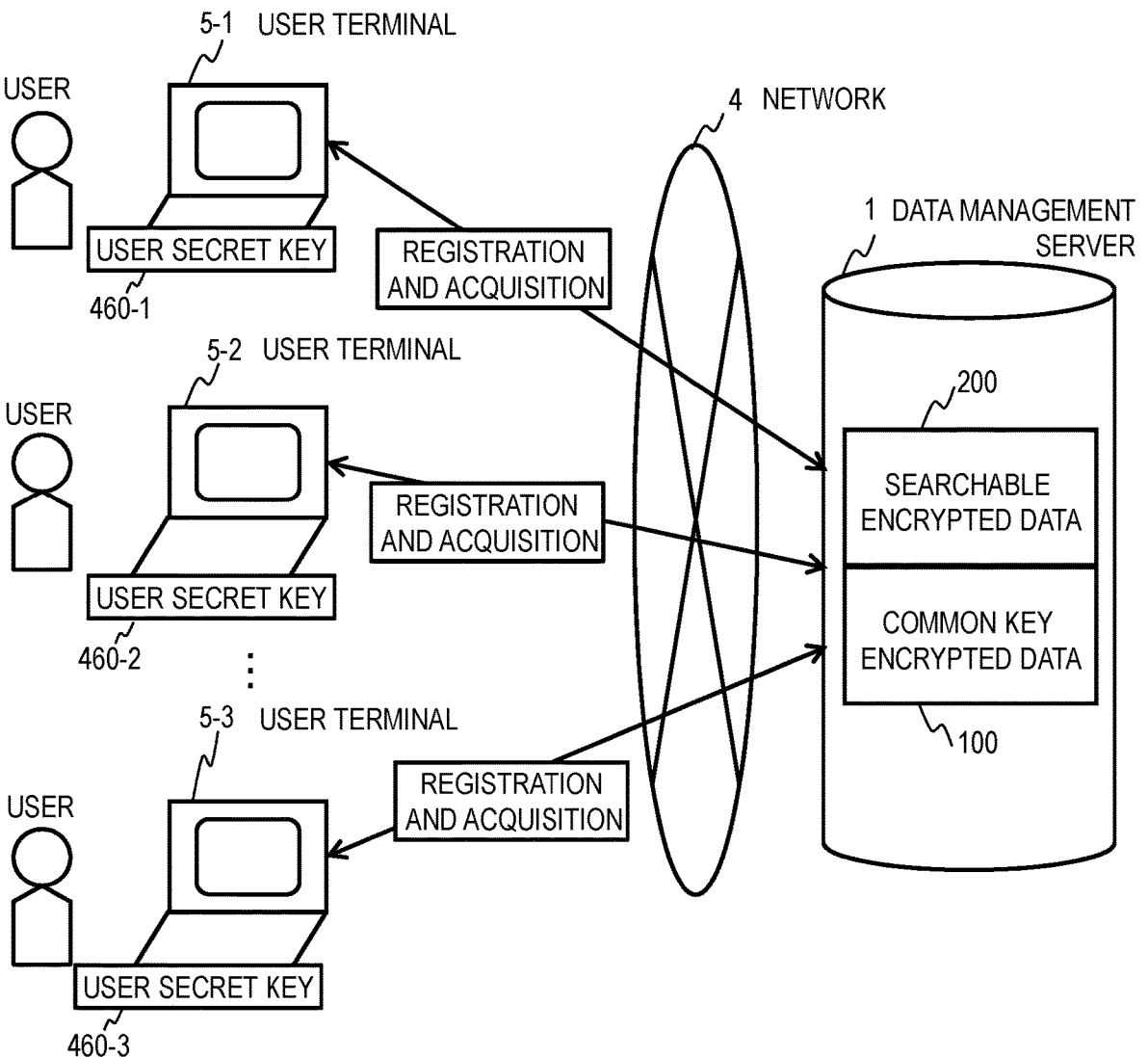
FIG. 12 is a block diagram for illustrating an example of a configuration of a data file encryption and transmission/reception system according to a third embodiment of this invention.

FIG. 12 is a block diagram for illustrating an example of a configuration of a data file encryption and transmission/reception system according to a third embodiment of this invention. In the third embodiment, description is given of an example in which a plurality of user terminals 5-1 to 5-3 are added to the modification example of the first embodiment, and one data file 410 is transmitted and received. The rest of the configuration is the same as that of the above-mentioned first embodiment.

As a utilization method of this invention in an actual task, it is conceivable to share files in an organization as in a file server or to encrypt the data file 410 and then transmit and receive the encrypted data file 410 in a peer-to-peer manner. In those cases, it is preferred that the data file 410 be encrypted on a communication path and within the data management server 1 in order to prevent leakage of information.

As the related art for a file server, there have been proposed a method of storing the data file 410 in plaintext within the datacenter to search for the file and a method of storing the file name in plaintext and encrypting the data file 410 to achieve the search while the data file 410 is encrypted.

In the above-mentioned cases, when eavesdropping occurs, the data file 410 is easily inferred from the file name in plaintext. Thus, a problem in terms of security exists.

The third embodiment solves the above-mentioned problem, and enables the transmission and the reception of the one data file 410 among a plurality of users while the security and practicality are maintained. The data file encryption and transmission/reception system according to the third embodiment includes the plurality of user terminals 5-1 to 5-3 and the data management server 1.

In FIG. 12, the searchable encrypted data 200 and the common key encrypted data 100 are stored in the one data management server 1, but the data management server 1 may be in the divided form as in the second embodiment. When the user terminals are not distinguished from one another, reference symbol "5" without "-" and the following part is hereinafter used. The same applies to reference symbols for other components.

To the user terminals 5-1 to 5-3, the user secret keys 460-1 to 460-3 are distributed for users in advance, respectively. Moreover, each user terminal 5 includes the registration module 20 and the search module 30 (not shown) as described in the modification example of the first embodiment.

The user terminal 5 generates the common key encrypted data 100 from the data file 410 in plaintext in accordance with the common key encryption method. After that, the user terminal 5 applies the searchable encryption technology to generate the searchable encrypted data 200 from the data including the common key in accordance with the probabilistic encryption method, and registers the common key encrypted data 100 and the searchable encrypted data 200 in the data management server 1.

The data registered in the data management server 1 can be searched and acquired by the plurality of user terminals 5.

In a standard common key encryption method, in order to share the same encrypted file among a plurality of persons, all concerned parties are required to manage a common key used for the encryption.

For example, it is assumed that the same common key is used in an organization, and a data holder leaves this organization. In this case, it is required to reissue a new common key and to distribute the reissued key in the organization so that the left person is unable to view the data, which is likely to complicate management.

Meanwhile, in the searchable encryption method, even when the users use the secret keys 460 different from user to user, the same file can be encrypted and decrypted.

In the third embodiment, it is also possible to assign an access right linked to the user secret key 460 to each individual. The access right can be deleted by invalidating the user secret key 460 of the left person, and hence high security performance can be ensured without complicated management.

Fourth Embodiment

Figure 13:
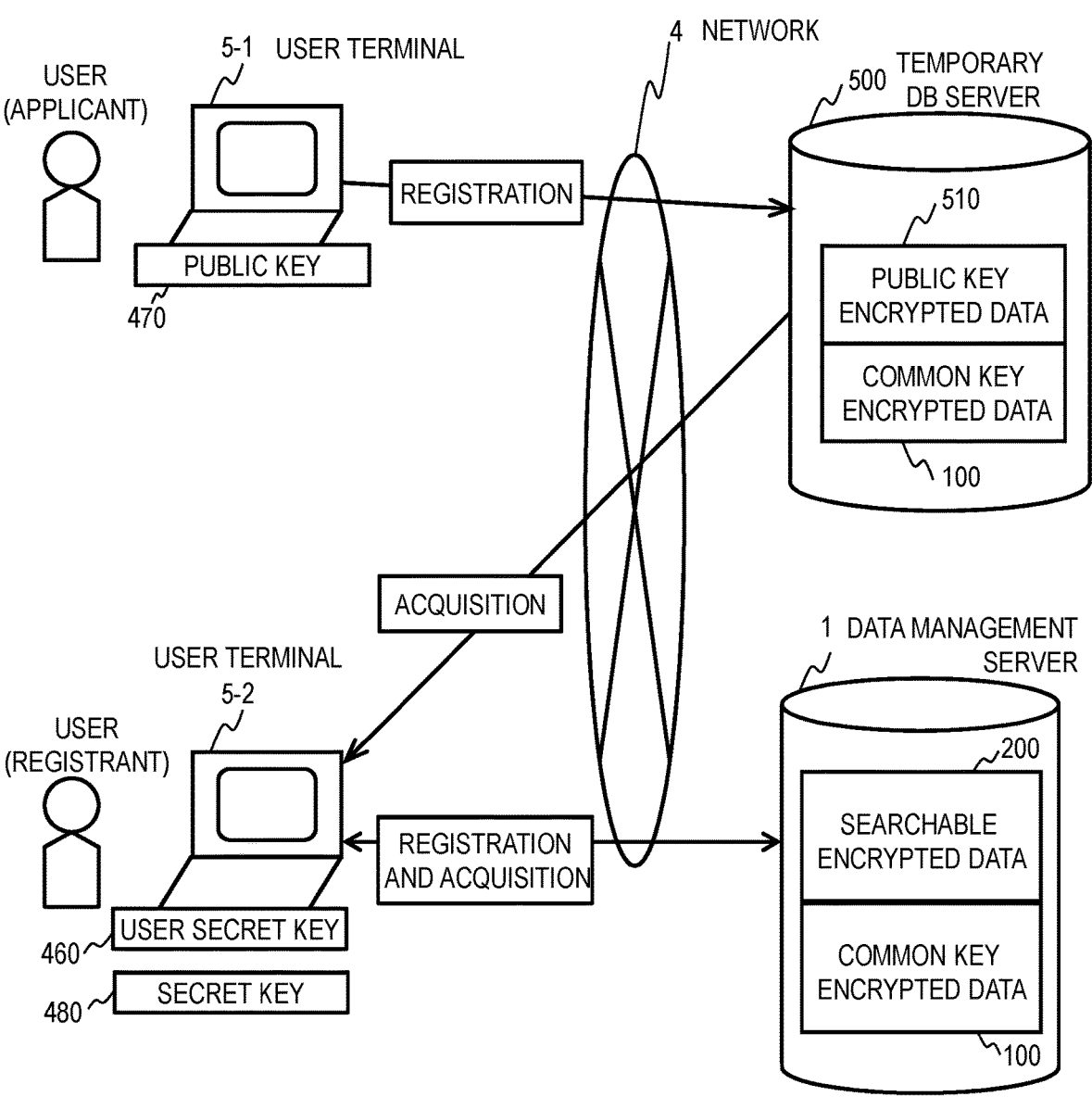
FIG. 13 is a block diagram for illustrating an example of a configuration of a data file encryption and transmission/reception system according to a fourth embodiment of this invention.

FIG. 13 is a block diagram for illustrating an example of a configuration of a data file encryption and transmission/reception system according to a fourth embodiment of this invention. In the fourth embodiment, there is described an example in which, in addition to the configuration of the modification example of the first embodiment, a user who has already executed the registration (registrant) uses the user terminal 5-2 to register, in the data management server 1, the data file 410 encrypted by a new user (user terminal 5-1) not holding the user secret key 460.

In the fourth embodiment, a temporary database server 500 is added to the configuration of the modification example of the first embodiment. The rest of the configuration is equivalent to that of the first embodiment. The fourth embodiment is different from the first embodiment in that the user terminal 5-1 holds a public key 470 distributed in advance, and the user terminal 5-2 holds a secret key corresponding to the public key 470.

The user secret key 460 used for the searchable encryption method is assigned to each user who has already executed the registration (registrant).

There is assumed a situation in which a large number of users who unidirectionally register the data files 410 exist. It is not practical to distribute the user secret keys 460 to those users by attaching the user secret keys 460 to electronic mails or by storing the user secret keys 460 in storage media such as a USB memory and delivering the storage media by hand.

For example, there is assumed a system in which an individual uses an image of the Japanese individual number card to execute individual number card registration on a website, to thereby open a bank account.

There is required a mechanism for a user not having the user secret key 460 to register the data file 410 in the data management server 1. In this case, it is desired that the data file 410 be encrypted on a communication path and within the data management server 1 for safety.

The data file encryption and transmission/reception system according to the fourth embodiment includes the user terminal 5-1 used by a user (applicant) who does not hold the user secret key 460, the user terminal 5-2 used by the user (registrant) who holds the user secret key 460, the data management server 1, the temporary database server 500, and the network 4.

In FIG. 13, the searchable encrypted data 200 and the common key encrypted data 100 are stored in the one data management server 1, but the data management server 1 may be divided as in the second embodiment.

The temporary database server 500 is a database to which the standard encryption technology is applied (that is, encrypted data is stored in a storage device, but decrypted data is output in a datacenter).

The temporary database server 500 stores the common key encrypted data 100 encrypted in accordance with the common key encryption method and public key encrypted data 510 encrypted in accordance with the common key encryption. Moreover, the temporary database server 500 searches for the common key encrypted data 100 and the public key encrypted data 510 in response to a request from the user terminal 5-2.

<Registration Processing>

A user not holding the user secret key 460 is an applicant, and this applicant uses the user terminal 5-1.

The user terminal 5-1 of the applicant generates the common key encrypted data 100 from the data file 410 in plaintext in accordance with the common key encryption method through use of the common key 440 and the initial vector 450 generated as in the first embodiment.

After that, the user terminal 5-1 generates the public key encrypted data 510 with the distributed public key 470 in accordance with the public key encryption method from the common key 440, the initial vector 450, and the association ID 120 generated in plaintext. As the public key, it is preferred for the safety to use a public key and a secret key different from system to system or to use a public key which changes every time.

The user terminal 5-1 forms a set of the common key encrypted data 100 and the public key encrypted data 510, and registers the set in the temporary database server 500.

A user who holds the user secret key 460 and is to register the data file 410 of the applicant in the data management server 1 is the registrant. The registrant uses the user terminal 5-2.

The user terminal 5-2 of the registrant acquires the set of the public key encrypted data 510 and the common key encrypted data 100 from the temporary database server 500.

The user terminal 5-2 decrypts the acquired public key encrypted data 510 with a secret key 480 held by the registrant. The decrypted data includes the common key 440, the initial vector 450, the association ID 120, and other attribute information such as the file name when the attribute information is set.

The user terminal 5-2 generates the searchable encrypted data 200 from each piece of the decrypted data in accordance with the searchable encryption method as in the first embodiment.

The user terminal 5-2 forms a set of the common key encrypted data 100 and the searchable encrypted data 200, and registers the set in the data management server 1.

As a result of the above-mentioned processing, the common key 440, the initial vector 450, and the association ID 120 are encrypted with the public key 470 in the user terminal 5-1 of the applicant, and are decrypted with the secret key 480 in the user terminal 5-2 of the registrant. Consequently, only the encrypted data exists on the communication path and in the data management server 1, and hence the encryption and the decryption can be executed in only the user terminal 5-2 of the registrant. Thus, the confidential data file 410 can be transmitted and received while the risk of the leakage of the information is reduced.

Fifth Embodiment

Figure 14:
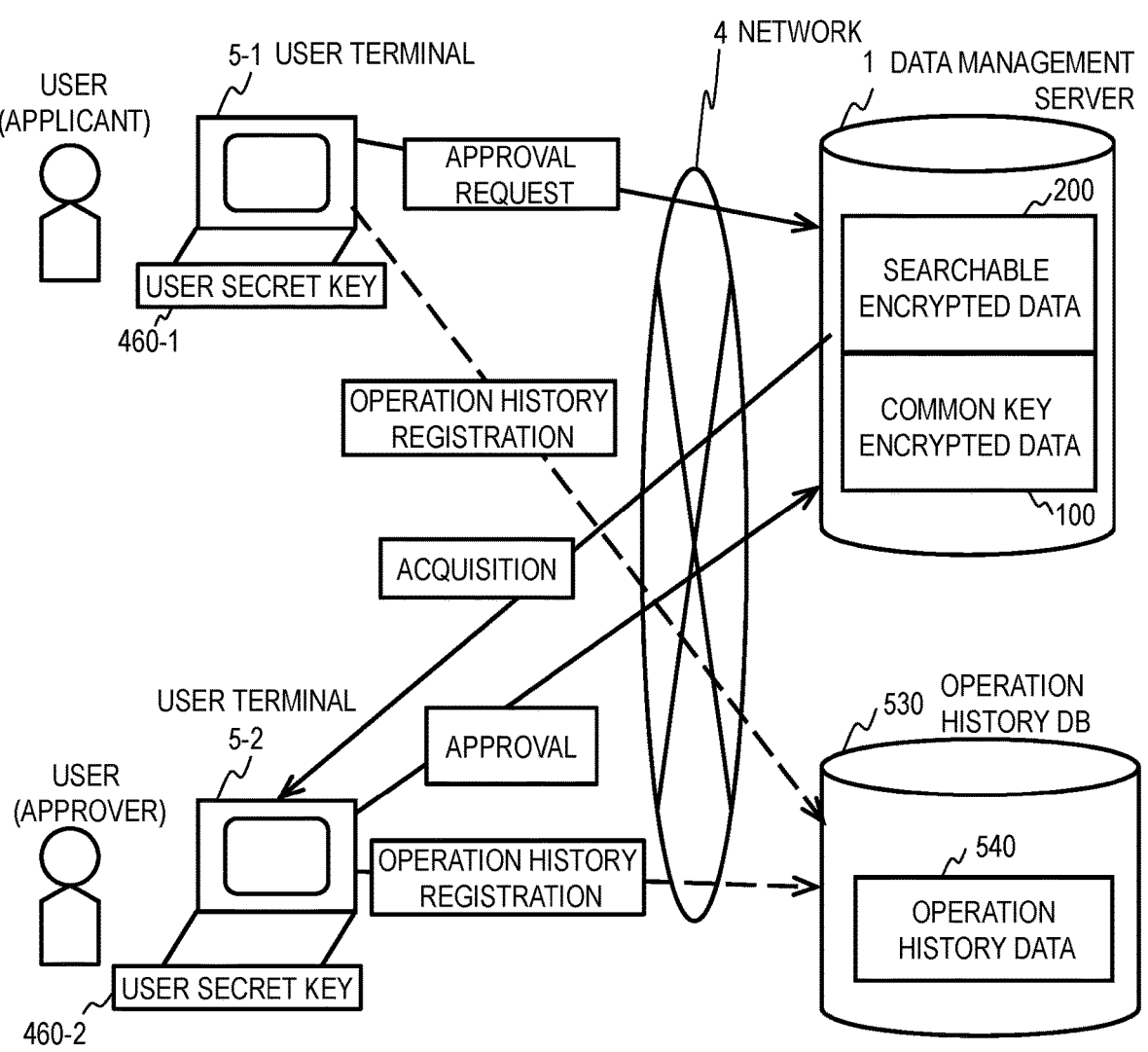
FIG. 14 is a block diagram for illustrating an example of a configuration of the workflow system which applies for and approves the data file according to a fifth embodiment of this invention.

In a fifth embodiment of this invention, there is described an example in which a workflow system which applies for and approves the data file 410 is provided by adding an operation history database 530 illustrated in FIG. 14 to the configuration of the first embodiment. A configuration other than the operation history database 530 is the same as that of the first embodiment. In the fifth embodiment, there is described an example in which the data file encryption and transmission/reception system according to the first embodiment is used as the workflow system.

FIG. 14 is a block diagram for illustrating an example of a configuration of the workflow system which applies for and approves the data file 410 in the fifth embodiment.

When the data file 410 is used to conduct a task, there is assumed a task in which the user (registrant) applies for the data file 410 in a workflow, and an approver checks the data file 410, and approves or returns the data file 410.

In general, the hybrid cryptograph used to transmit and receive the data file 410 uses the public key encryption method. Thus, a key for the encryption and a key for the decryption are different from each other, and hence a person who has encrypted the data file 410 cannot decrypt the encrypted data file 410 by himself or herself. Thus, there is a problem in that when the approver returns the data file 410, the registrant himself or herself cannot check and correct the data file 410.

There is required such a mechanism that the same data file 410 is applied for, checked, approved, and corrected between the registrant and the approver. In this case, it is desired that the data file 410 be encrypted on a communication path and within the data management server 1 for safety.

The workflow system in the fifth embodiment includes the user terminal 5-1 used by the user (registrant), the user terminal 5-2 used by the user (approver), the data management server 1, the operation history database 530, and the network 4 which couples the computers to each other.

In FIG. 14, there is illustrated the example in which the searchable encrypted data 200 and the common key encrypted data 100 are stored in the one data management server 1, but the data management server 1 may be divided as in the second embodiment.

The operation history database 530 stores the operation history data 540 encrypted through use of the searchable cryptograph technology in the form which cannot be decrypted within the data management server 1. Moreover, in the fifth embodiment, a user who transmits an approval request is the registrant, and a user who checks, and approves or returns the approval request is the approver.

In the fifth embodiment, authority of the registrant or the approver is set to each user who uses the user terminal 5-1 or 5-2. The user terminal 5-1 of the registrant encrypts the data file 410, to thereby generate the common key encrypted data 100 and the searchable encrypted data 200 through the procedure of the first embodiment, and transmits those pieces of encrypted data to the data management server 1, to thereby apply for the registration. In this case, the encrypted data (the common key encrypted data 100 and the searchable encrypted data 200) are brought into a status of waiting for the approval.

The user terminal 5-2 of the approver searches the data management server 1 for data in the status of waiting for the approval. The user terminal 5-2 acquires the retrieved data, and approves or returns the data. When the user terminal 5-2 approves the encrypted data, the status of the encrypted data (the common key encrypted data 100 and the searchable encrypted data 200) becomes an approved status. When the user terminal 5-2 returns the encrypted data, the status of the encrypted data becomes a returned status. In this case, one or a plurality of approvers may exist for one registration application.

The user terminal 5-1 of the registrant uses the own user secret key 460 to decrypt the returned encrypted data (the common key encrypted data 100 and the searchable encrypted data 200), checks and corrects the decrypted data, and again transmits the approval request.

All of the operations which are the registration application by the registrant, the approval or the return by the approver, and the like are encrypted by searchable cryptography as the operation history data 540 by each user terminal 5 applying the searchable encryption technology, and then are registered in the operation history database 530.

As described above, in the fifth embodiment, even when the registrant and the approver hold the different user secret keys 460, the same data file 410 can be encrypted and decrypted by applying the searchable encryption technology to the workflow system.

Further, the searchable encryption technology has such a nature that the same data or query is encrypted into a ciphertext which changes every time (not based on a constant law). Thus, even when the same data is transmitted and received a plurality of times, a random number which changes every time is obtained, and hence the security is increased.

Sixth Embodiment

A sixth embodiment of this invention is a data file encryption and transmission/reception system which is obtained by combining the first, third, and forth embodiments, and in which an individual (user) registers the data file 410, and an enterprise or a group utilizes the data file 410.

Figure 15:
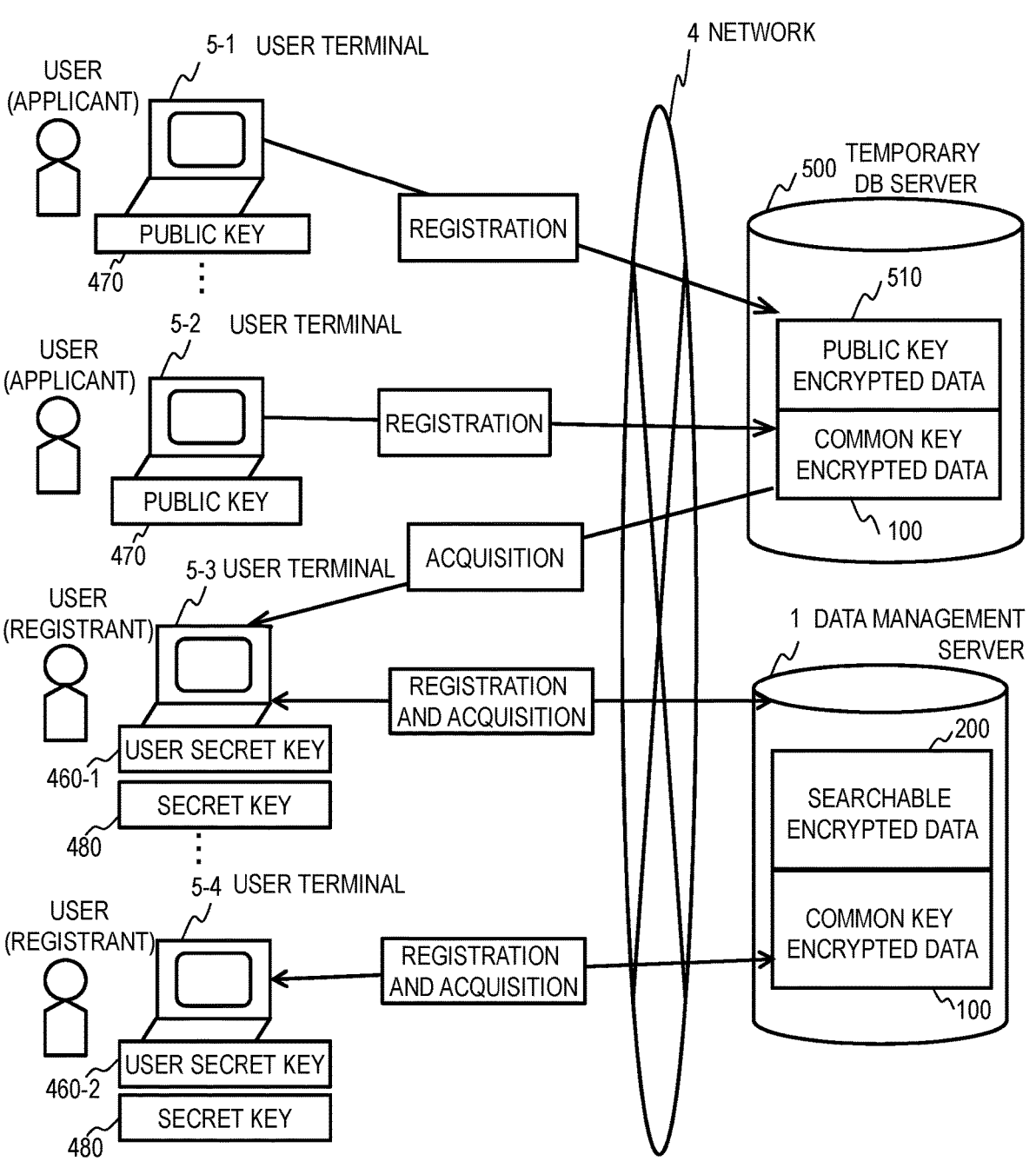
FIG. 15 is a schematic diagram for illustrating an example of an overview of a configuration of the system in the sixth embodiment in which an individual registers the data file, and an enterprise or a group utilizes the data file according to a sixth embodiment of this invention.

FIG. 15 is a schematic diagram for illustrating an example of an overview of a configuration of the system in the sixth embodiment in which an individual registers the data file 410, and an enterprise or a group utilizes the data file 410.

While an extension of possibility of use and utilization of personal data is in progress, Personal Information Protection Act was revised in 2020. In the revised act, for example, an upper limit of a fine imposed on a corporate body which has committed fraud is increased, and hence responsibility of an enterprise which handles personal data has increased. It can be said that many enterprises desire to reexamine conventional personal information management systems, to thereby utilize information systems suited to the current situation.

The sixth embodiment is a data file encryption and transmission/reception system in which, when consent from an individual is obtained, the individual registers personal data on himself or herself in the temporary database server 500 via the network 4 such as the Internet, and an enterprise or a group can utilize this registered personal data in a safe form.

As a utilization example of this data file encryption and transmission/reception system, there is assumed a system which collects, on a cloud, information on patients scattered all over Japan. It is preferred that the individual be a patient, the group be a medical institution, and the data file 410 be a clinical record (or clinical information or medical information).

As the utilization example of this data file encryption and transmission/reception system, there is assumed a system which collects results of medical checkup of employees on a cloud, and manages health of the employees through interview registration, for example. In this case, it is preferred that the individual be the employee, the organization be an industrial doctor or an insurance doctor, and the data file 410 be a medical checkup result.

In the sixth embodiment, a data file encryption and transmission/reception system which collects patient information is exemplified. The data file encryption and transmission/reception system according to the sixth embodiment includes user terminals 5-1 to 5-4, the data management server 1, the temporary database server 500, and the network 4.

In FIG. 15, the searchable encrypted data 200 and the common key encrypted data 100 are stored in the one data management server 1, but the data management server 1 may be divided as in the second embodiment.

It is assumed that the clinical record is registered by the patient himself or herself from the user terminal 5-1 or 5-2, and the applicant (patient) holds the public key 470 and does not hold the user secret key 460. It is also assumed that the applicant does not view individual data in the data management server 1.

As in the fourth embodiment, each of the user terminals 5-1 and 5-2 used by the patient (applicant) encrypts the data file 410 (clinical record) in plaintext in accordance with the common key encryption method having the high encryption processing speed, to thereby generate the common key encrypted data 100. The user terminals 5-1 and 5-2 encrypts the common key 440, the initial vector 450, and the association ID 120 in accordance with the public key encryption method, to thereby generate the public key encrypted data 510. Each of the user terminals 5-1 and 5-2 forms a set of the common key encrypted data 100 and the public key encrypted data 510, and stores the set in the temporary database server 500.

A user who uses each of the user terminals 5-3 and 5-4 is a registrant (doctor) of the data management server 1, and holds the user secret key 460. Each of the user terminals 5-3 and 5-4 of the doctor acquires the set of the public key encrypted data 510 and the common key encrypted data 100 from the temporary database server 500, and decrypts the public key encrypted data 510 through use of the secret key 480 held by the registrant (doctor), to thereby generate the common key 440, the initial vector 450, and the association ID 120.

Each of the user terminals 5-3 and 5-4 generates the searchable encrypted data from the common key 440, the initial vector 450, and the association ID 120 of the decrypted public key encrypted data 510 with the user secret key 460 in accordance with the searchable encryption method. Each of the user terminals 5-3 and 5-4 stores the searchable encrypted data together with the common key encrypted data 100 in the data management server 1.

Moreover, as in the fifth embodiment, the clinical record (common key encrypted data 100) of the data management server 1 registered by the patient may be viewed and approved by a plurality of doctors. In this case, it is assumed that the clinical record is registered by the doctor. In this case, as in the first embodiment, each of the user terminal 5-3 and 5-4 of the doctor encrypts the clinical record in plaintext in accordance with the common key encryption method, and encrypts the common key in accordance with the searchable encryption method. Each of the user terminal 5-3 and 5-4 of the doctor stores the data encrypted through use of the searchable cryptograph technology in the data management server 1 in the form that cannot be decrypted within the data management server 1.

As described above, in the sixth embodiment, the encryption and the decryption of the data file 410 can be achieved while both of the high speed and the security performance of the processing are maintained when the patient (user) registers the data file 410, and an enterprise or a group utilizes the data file 410.

<Conclusion>

As described above, the data file encryption and transmission/reception system according to the above-mentioned embodiments can be configured as described below.

(1) There is provided a data file encryption system including a computer (registration client terminal 2) which includes a processor (21) and a memory (22), and is configured to encrypt a data file (410) which has been input, and to register the encrypted data file in a data management server (1) coupled via a network (4), wherein the computer (2) includes a registration module (20) configured to encrypt the data file (410), and to register the encrypted data file in the data management server (1), and wherein the registration module (20) includes: a string conversion module (210) configured to convert the data file (410) to be encrypted to string data (420); a key generation module (220) configured to generate a common key (440), and to divide the common key (440) and the string data (420) into first input information and second input information; a common key encryption module (230) configured to encrypt the first input information with the common key (440), to thereby generate common key encrypted data (100); a searchable encryption module (240) configured to encrypt the second input information in accordance with searchable encryption with a user secret key (460) set in advance, to thereby generate searchable encrypted data (200); and a communication module (260) configured to register a set of the common key encrypted data (100) and the searchable encrypted data (200) in the data management server (1).

With the above-mentioned configuration, the data to be encrypted is divided into the two pieces of data in accordance with the nature of the data to be registered in the data management server 1. The one piece of data is encrypted in accordance with the common key encryption method having high encryption processing speed. The other piece of data is further encrypted in accordance with the searchable encryption method having high security performance. Consequently, the encryption and decryption, and the transmission and reception of the data file which maintain both of the high speed and the security performance of the processing can be achieved only through software processing without using dedicate hardware.

(2) In the data file encryption system according to Item (1), the computer (2) further includes a search module (30) configured to acquire the common key encrypted data (100) and the searchable encrypted data (200) from the data management server (1), and to decrypt the common key encrypted data (100) and the searchable encrypted data (200) into the data file (410), the registration module (20) further includes an association ID generation module (250) configured to generate an association ID (120) for associating the set of the common key encrypted data (100) and the searchable encrypted data (200) with each other, and the search module (30) is configured to acquire the association ID (120), to thereby identify the set of the common key encrypted data (100) and the searchable encrypted data (200) stored in the data management server (1), and to acquire the identified common key encrypted data (100) and searchable encrypted data (200).

With the above-mentioned configuration, the divided two pieces of data, namely, the common key encrypted data 100 and the searchable encrypted data 200, can be identified through use of the association ID 120 as the data to be decrypted. As a result, the common key encrypted data 100 and the searchable encrypted data 200 can also be stored in computers different from each other.

(3) In the data file encryption system according to Item (2), the key generation module (220) is configured to include the generated association ID (120) and the common key (440) in the second input information, and to include the generated string data (420) in the first input information, and the search module (30) includes: a searchable cryptograph decryption module (310) configured to decrypt the searchable encrypted data (200) acquired from the data management server (1) with the user secret key (460), to thereby acquire the association ID (120) and the common key (440) from the second input information; a common key cryptograph decryption module (320) configured to search the data management server (1) by the association ID (120) for the common key encrypted data (100) corresponding to the searchable encrypted data (200) to acquire the common key encrypted data (100) corresponding to the association ID (120), and to decrypt the common key encrypted data (100) with the decrypted common key (440), to thereby generate the string data (420); and a string conversion module (320) configured to generate the data file (410) from the string data (420).

With the above-mentioned configuration, the user secret key 460 used for the searchable encryption method is assigned to each user who uses the registration client terminal 2 or the search client terminal 3. After the user secret key 460 has once been passed and then received, the transmission and the reception of the user secret key does not occur. It is thus possible to suppress the risk of the leakage of the user secret key 460 compared with the related art in which a random number (pseudo random number) and a numerical value for random number generation are transmitted and received each time data is encrypted.

The searchable encryption method uses the common key encryption method, and hence the registration client terminal 2 and the search client terminal 3 can execute the encryption and decryption with the own user secret key 460 held by those client terminals themselves. Thus, the registration, the search, and the acquisition of the data file by the same user can be achieved, which cannot be achieved by the public key cryptography having different keys for the encryption and the decryption.

(4) In the data file encryption system according to Item (3), the computer includes a first computer (registration client terminal 2) and a second computer (search client terminal 3) which are coupled to the data management server (1), the first computer (2) includes the registration module (20), and the second computer (3) includes the search module (30).

With the above-mentioned configuration, the registration client terminal 2 which registers the data file 410 and the search client terminal 3 which uses the encrypted data file 410 use the common key encryption method for the searchable encryption method, and hence the registration client terminal 2 and the search client terminal 3 can execute the encryption and decryption with different user secret keys 460 held by those client terminals themselves. Thus, the registration, the search, and the acquisition of the data file by the same user can be achieved, which cannot be achieved by the public key cryptography having different keys for the encryption and the decryption.

(5) In the data file encryption system according to Item (3), the key generation module (220) is configured to generate the common key (440) which changes every time and an initial vector, which is a unique pseudo random number to be added when the first input information is to be encrypted, through use of a key generation library (430) set in advance, and to include the association ID (120), the common key (440), and the initial vector (450) in the second input information, the common key encryption module (220) is configured to encrypt the first input information through use of the common key (440) and the initial vector (450), and the searchable encryption module (240) is configured to encrypt the second input information in accordance with probabilistic encryption which uses a mask using the user secret key (460), the pseudo random number, and a homomorphic function.

With the above-mentioned configuration, the registration client terminal 2 generates the common key 440 which changes every time and the initial vector 450, to thereby achieve the encryption and the randomization through use of the method not based on a constant law. The searchable encryption method is the probabilistic encryption method which uses the mask using the user secret key 460, the pseudo random number, and the homomorphic function, and has such a nature that the same data or query is encrypted to a ciphertext which changes every time (not based on a constant law). As a result, all pieces of encrypted data are random numbers, and hence have higher security than that of a standard hybrid cryptograph.

(6) In the data file encryption system according to Item (4), the searchable encryption module (240) of the first computer (2) is configured to generate the searchable encrypted data (200) through use of common key encryption, and the searchable cryptograph decryption module (310) of the second computer (3) is configured to decrypt the searchable encrypted data (200) acquired from the data management server (1) with the user secret key (460) different from the user secret key of the first computer (2).

With the above-mentioned configuration, the registration client terminal 2 and the search client terminal 3 can execute the encryption and the decryption with the user secret key 460 held by themselves. As a result, the registration client and the search client may be the same computer, or may be computers different from each other.

(7) In the data file encryption system according to Item (1), the key generation module (220) is configured to include one of a name or attribute information of the data file (410) in the second input information.

With the above-mentioned configuration, in the data management server 1, the search by the file name and the keyword can be achieved by the registration client terminal 2 applying, in advance, the searchable encryption to the attribute information (such as the file name of the data file 410 to be acquired, and the keyword for the search which the user can optionally set), and registering the encrypted attribute information in the data management server 1.

(8) In the data file encryption system according to Item (3), the data management server (1) includes: a first data management server (1) configured to store the common key encrypted data (100); and a second data management server (1) configured to store the searchable encrypted data (200), and the search module (30) is configured to search the first data management server (1) by the association ID (120)

decrypted by the searchable cryptograph decryption module (310), to thereby acquire the common key encrypted data (100).

With the above-mentioned configuration, the common key encrypted data 100 and the searchable encrypted data 200, which are divided and then stored in the two servers, can be identified through use of the association ID 120 as the data to be decrypted.

(9) In the data file encryption system according to Item (3), the data file encryption system further includes a temporary database server (500) which is coupled to a computer via the network, and is configured to store data, the computer further includes: an applicant terminal (5-1) which includes a public key (470) distributed in advance and the registration module (20); a registrant terminal (5-2) which has a secret key (480) corresponding to the public key (470) distributed in advance, and includes the registration module (20) and the search module (30), the applicant terminal (5-1) is configured to, in the registration module (20), encrypt the data file (410) with the common key (440), to thereby generate the common key encrypted data (100), encrypt the common key (440) and the association ID (120) with the public key (470), to thereby generate public key encrypted data (510), and to register the common key encrypted data (100) and the public key encrypted data (510) in the temporary database server (500), and the registrant terminal (5-2) is configured to acquire the common key encrypted data (100) and the public key encrypted data (510) from the temporary database server (500), decrypt the public key encrypted data (510) with the secret key (480), encrypt the decrypted common key (440) and the association ID (120) with the user secret key (460) in accordance with the searchable encryption, to thereby generate the searchable encrypted data (200), and to register the common key encrypted data (100) and the searchable encrypted data (200) in the data management server (1).

With the above-mentioned configuration, the common key 440, the initial vector 450, and the association ID 120 are encrypted with the public key 470 in the user terminal 5-1 of the applicant, and are decrypted with the secret key 480 in the user terminal 5-2 of the registrant. Consequently, only the encrypted data exists on the communication path and in the data management server 1, and hence the encryption and the decryption can be executed in only the user terminal 5-2 of the registrant. Thus, the confidential data file 410 can be transmitted and received while the risk of the leakage of the information is reduced.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A data file encryption, transmission and reception system, comprising:

a temporary database server configured to store data; and a computer, which is coupled to the temporary database server via a network, and includes a processor and a memory, the computer configured to:

convert the data file to be encrypted to string data, generate a common key, which changes every time and an initial vector, which is a pseudo random number, divide the string data into a first string data and second string data, encrypt first input information and the first string data with the common key, thereby generating common key encrypted data, encrypt second input information, the common key, and the second string data in accordance with probabilistic encryption which uses a mask using the user secret key, the pseudo random number, and a homomorphic function, thereby generating searchable encrypted data, and register a set of the common key encrypted data and the searchable encrypted data in the data management server, wherein the computer further includes:

an applicant terminal which includes a public key distributed in advance; and a registrant terminal which has a secret key corresponding to the public key distributed in advance, wherein the applicant terminal is configured to encrypt the data file with the common key, to thereby generate the common key encrypted data, encrypt the common key and the association ID with the public key, to thereby generate public key encrypted data, and to register the common key encrypted data and the public key encrypted data in the temporary database server, and wherein the registrant terminal is configured to acquire the common key encrypted data and the public key encrypted data from the temporary database server, decrypt the public key encrypted data with the secret key, encrypt the decrypted common key and the association ID with the user secret key in accordance with the searchable encryption, to thereby generate the searchable encrypted data, and to register the common key encrypted data and the searchable encrypted data in the data management server.

2. The data file encryption, transmission and reception system according to claim 1, wherein the computer is configured to:

generate an association ID for associating the set of the common key encrypted data and the searchable encrypted data with each other, acquire the association ID, to thereby identify the set of the common key encrypted data and the searchable encrypted data stored in the data management server, and acquire the identified common key encrypted data and searchable encrypted data from the data management server.

3. The data file encryption, transmission and reception system according to claim 2, wherein the generated association ID is included in the second input information, wherein the computer is configured to:

decrypt the searchable encrypted data acquired from the data management server with the user secret key, to thereby acquire the association ID from the second input information and the common key, search the data management server by the association ID for the common key encrypted data corresponding to the searchable encrypted data to acquire the common key encrypted data corresponding to the association ID, and to decrypt the common key encrypted data with the decrypted common key, to thereby generate the string data, and generate the data file from the string data.

4. The data file encryption, transmission and reception system according to claim 3, wherein the computer includes a first computer and a second computer which are coupled to the data management server, wherein the first computer is configured to register a set of the common key encrypted data and the searchable encrypted data in the data management server, and wherein the second computer is configured to:

acquire the association ID, to thereby identify the set of the common key encrypted data and the searchable encrypted data stored in the data management server, and acquire the identified common key encrypted data and searchable encrypted data from the data management server.

5. The data file encryption, transmission and reception system according to claim 3, wherein the computer is configured to:

include the association ID and the initial vector in the second input information, and encrypt the first input information through use of the common key and the initial vector.

6. The data file encryption, transmission and reception system according to claim 4, wherein the first computer is configured to generate the searchable encrypted data through use of common key encryption, and wherein the second computer is configured to decrypt the searchable encrypted data acquired from the data management server with the user secret key different from the user secret key of the first computer.

7. The data file encryption, transmission and reception system according to claim 1, wherein the computer is configured to include one of a name or attribute information of the data file in the second input information.

8. The data file encryption, transmission and reception system according to claim 3, wherein the data management server includes:

a first data management server configured to store the common key encrypted data; and a second data management server configured to store the searchable encrypted data, and wherein the computer is configured to search the first data management server by the decrypted association ID, to thereby acquire the common key encrypted data.

9. A data file encryption, transmission and reception method executed by a system including a computer the method comprising:

a string conversion step of converting the data file to be encrypted to string data;

a key generation step of generating a common key, which changes every time and an initial vector, which is a pseudo random number, and dividing the string data into first string data and second string data;

a common key encryption step of encrypting the first input information and the first string data with the common key, to thereby generate common key encrypted data;

a searchable encryption step of encrypting the second input information, the common key, and the second string data, in accordance with probabilistic encryption which uses a mask using the user secret key, the pseudo random number, and a homomorphic function, to thereby generate searchable encrypted data;

a communication step of registering a set of the common key encrypted data and the searchable encrypted data in the data management server, wherein the computer further includes:

an applicant terminal which includes a public key distributed in advance, and is configured to execute the registration step; and a registrant terminal which has a secret key corresponding to the public key distributed in advance, and is configured to execute the registration step and the search step, and wherein the data file encryption, transmission and reception method further comprises:

encrypting, by the applicant terminal, the data file with the common key, to thereby generate the common key encrypted data, encrypting the common key and the association ID with the public key, to thereby generate public key encrypted data, and registering the common key encrypted data and the public key encrypted data in a temporary database server coupled via the network; and acquiring, by the registrant terminal, the common key encrypted data and the public key encrypted data from the temporary database server coupled via the network, decrypting the public key encrypted data with the secret key, encrypting the decrypted common key and the association ID with the user secret key in accordance with the searchable encryption, to thereby generate the searchable encrypted data, and registering the common key encrypted data and the searchable encrypted data in the data management server.

10. The data file encryption, transmission and reception method according to claim 9, further comprising:

a search step of acquiring, by the computer, the common key encrypted data and the searchable encrypted data from the data management server, and decrypting the common key encrypted data and the searchable encrypted data into the data file, wherein the registration step further includes an association ID generation step of generating an association ID for associating the set of the common key encrypted data and the searchable encrypted data with each other, and wherein the search step includes acquiring the association ID, to thereby identify the set of the common key encrypted data and the searchable encrypted data stored in the data management server, and acquiring the identified common key encrypted data and searchable encrypted data.

11. The data file encryption, transmission and reception method according to claim 10, wherein the key generation step includes including the generated association ID in the second input information, and wherein the search step includes:

a searchable cryptograph decryption step of decrypting the searchable encrypted data acquired from the data management server with the user secret key, to thereby acquire the association ID from the second input information and the common key;

a common key cryptograph decryption step of searching the data management server by the association ID for the common key encrypted data corresponding to the searchable encrypted data to acquire the common key encrypted data corresponding to the association ID, and decrypting the common key encrypted data with the decrypted common key, to thereby generate the string data; and a string conversion step of generating the data file from the string data.

12. The data file encryption, transmission and reception method according to claim 11, wherein the computer includes a first computer and a second computer which are coupled to the data management server, wherein the registration step is executed by the first computer, and wherein the search step is executed by the second computer.

13. The data file encryption, transmission and reception method according to claim 11, wherein the association ID and the initial vector are included in the second input information, wherein the common key encryption step includes encrypting the first input information through use of the common key and the initial vector.

* * * * *